United States Patent
Hariharan et al.

(10) Patent No.: US 10,528,905 B1
(45) Date of Patent: *Jan. 7, 2020

(54) BUSINESS DECISION MANAGEMENT SYSTEM TO OPERATIONAL DECISION MANAGEMENT ADAPTOR

(71) Applicant: Federal Home Loan Mortgage Corporation, McLean, VA (US)

(72) Inventors: Subramanian Hariharan, Chantilly, VA (US); Abdul Hameed Mahmad, Vienna, VA (US); Kenety Borges, Fairfax, VA (US); Suresh Kalkavery, Fairfax, VA (US); Adithi Chandran, Ashburn, VA (US); Ravindranath Mangalagiri, Brambleton, VA (US); Stephen Sepulveda, Reston, VA (US)

(73) Assignee: FEDERAL HOME LOAN MORTGAGE CORPORATION (FREDDIE MAC), McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/503,667

(22) Filed: Jul. 5, 2019

Related U.S. Application Data

(63) Continuation of application No. 15/046,093, filed on Feb. 17, 2016, now Pat. No. 10,387,819.

(51) Int. Cl.
*G06Q 10/06* (2012.01)
*G06N 5/02* (2006.01)

(52) U.S. Cl.
CPC ........ *G06Q 10/0635* (2013.01); *G06N 5/022* (2013.01)

(58) Field of Classification Search
None
See application file for complete search history.

(56) References Cited

U.S. PATENT DOCUMENTS

2008/0022270 A1* 1/2008 Morrow .................... G06F 8/38
717/155

* cited by examiner

*Primary Examiner* — Mehmet Yesildag
(74) *Attorney, Agent, or Firm* — MH2 Technology Law Group, LLP

(57) ABSTRACT

The present disclosure describes a device and methods that provide a new communication channel between two disparate decision management systems. In various embodiments, the device retrieves business logic artifacts from a first decision management system, analyzes them and creates equivalent business logic artifacts that operate on the second decision management system, and transmits the equivalent business logic artifacts for execution by the second decision management system via an API of the second decision management system. In various implementations, the device analyzes top-down decision flow artifacts from the first decision management system and creates equivalent bottom-up rule flow artifacts that are usable by the second decision management system.

20 Claims, 25 Drawing Sheets

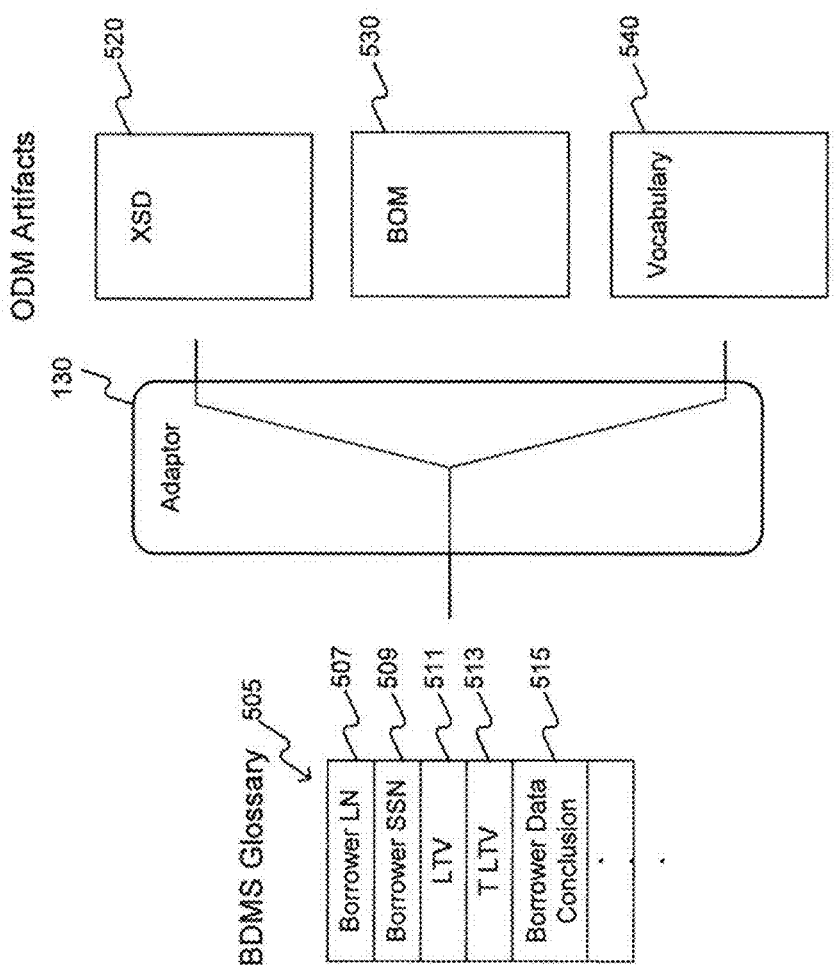

Reference Glossary — 601

```
<?xml version="1.0" encoding="UTF-8" standalone="yes"?>
<IronmanGlossaryContainer xmlns="com/freddiemac/eds/ironman/glossary">
    <IronmanGlossaryMetaData>
        <EdsCommunityName>Loan Origination</EdsCommunityName>
        <BdmsCommunityName>Loan Origination</BdmsCommunityName>
        <BdmsGlossaryHashKey>4edda8449380be7cd5aa893d38d3251e</BdmsGlossaryHashKey>
    </IronmanGlossaryMetaData>
    <IronmanGlossary>
        <Name>IronmanGlossary for Loan Origination-INTERNAL</Name>
        <Type>INTERNAL</Type>
        <XsmType>XSD</XsmType>
        <IronmanFactTypeContainer>
            <IronmanFactType>
                <BdmsDefinitionId>8682912</BdmsDefinitionId>          ← 610
                <BdmsName>Borrower Name</BdmsName>
                <BdmsCardinality>SINGLE</BdmsCardinality>
                <BdmsDataType>NAME</BdmsDataType>
                <BdmsVersion>0.2</BdmsVersion>
                <DomainValueContainer>
                    <BdmsDomainType>ANY_VALUE</BdmsDomainType>
                    <EdsDomainType>ANY_VALUE</EdsDomainType>
                    <DomainValueMapping/>
                </DomainValueContainer>
                <EdsName>EDSBorrowerName</EdsName>                    ← 615
                <EdsDataType>FMName</EdsDataType>
                <EdsFactTypeContainer>EDSBorrowerDetailContainer</EdsFactTypeContainer>
                <EdsXpath>/EDSInternalContainer/EDSLoanContainer[]/EDSBorrowerContainer[]/EDSBorrowerDetailContainer/EDSBorrowerName</EdsXpath>
                <isPersistent>YES</isPersistent>
                <isRepeatable>NO</isRepeatable>
            </IronmanFactType>
```

FIG. 6B

ODM BOM

```
public class EDSBorrowerDetailContainer
    extends ilog.rules.xml.IlrXmlObject
    property "ilog.rules.engine.driver" "ilog.rules.xml.binding.IlrXmlClassDriver"
    property "ilog.rules.xml.classInfo" {
        derivation "EXTENSION",
        model "sequence",
        version "ilog.rules.xml.binding.IlrXmlDefaultDataDriver_2_0",
        xmlFieldNumber "4",
        xmlScope "global",
        xmlType "{com/freddiemac/common/datatransformation/vo/edm}EDSBorrowerDetailContainer",
        xsdLocation "EDSInternalStructure.xsd"
    }
{
    public ilog.rules.xml.types.IlrDate EDSBorrowerDOB domain 0,1
        property "ilog.rules.xml.fieldInfo" {
            index "2",
            xmlKind "ELEMENT",
            xmlName "{com/freddiemac/common/datatransformation/vo/edm}EDSBorrowerDOB",
            xmlType "{com/freddiemac/common/datatransformation/vo/edm}FMDate",
            xsdComponentType "com.freddiemac.common.datatransformation.vo.edm.FMDate"
        };
    public string EDSBorrowerName domain 0,1
        property "ilog.rules.xml.fieldInfo" {       ← 620
            index "0",
            xmlKind "ELEMENT",
            xmlName "{com/freddiemac/common/datatransformation/vo/edm}EDSBorrowerName",
            xmlType "{com/freddiemac/common/datatransformation/vo/edm}FMName",
            xsdComponentType "com.freddiemac.common.datatransformation.vo.edm.FMName"
        };
    public ilog.rules.xml.types.IlrDate EDSBorrowerNationality domain 0,1
        property "ilog.rules.xml.fieldInfo" {
            index "3",
            xmlKind "ELEMENT",
            xmlName "{com/freddiemac/common/datatransformation/vo/edm}EDSBorrowerNationality",
            xmlType "{com/freddiemac/common/datatransformation/vo/edm}FMDate",
            xsdComponentType "com.freddiemac.common.datatransformation.vo.edm.FMDate"
        };
    public java.math.BigDecimal EDSBorrowerSSN domain 0,1
```

FIG. 6C

ODM Vocabulary

FIG. 6D

ODM Decision Table

Conclusion Dependencies: None

ODM Decision Table

FIG. 7D

Conclusion Dependencies: Borrower Detail DQ Completeness (FIG. 7B)

ODM Decision Table

Conclusion Dependencies: Borrower Detail DQ Completeness (FIG. 7B)
Borrower Income Detail DQ Completeness (FIG. 7C)
Borrower Credit Detail DQ Completeness (FIG. 7D)

FIG. 7E

BUSINESS DECISION MANAGEMENT SYSTEM TO OPERATIONAL DECISION MANAGEMENT ADAPTOR

CROSS-REFERENCE TO RELATED APPLICATIONS

This application is a continuation of U.S. patent application Ser. No. 15/046,093, filed on Feb. 17, 2016, the entirety of which is incorporated by reference herein.

FIELD OF THE INVENTION

This invention relates to an adaptor that provides an automated communication and translation channel between a business decision management system and an operation decision management system.

BACKGROUND

Decision management entails all aspects of designing, building and managing the automated decision making systems that an organization uses to manage its interactions, both internal and external. Over the last several years, many different computerized systems that automate decision management have come onto the market, providing benefits such as decreased response times, unattended operation, and information-based decisions that are driven by analysis of historical behavioral data, prior decisions, and their outcomes.

An example of the type of computerized decision management system known as a Business Decision Management System (BDMS) is the Sapiens DECISION™ system by Sapiens International Corporation. A BDMS such as Sapiens DECISION™ allows organizations, e.g., companies and non-profit organizations, to centrally author, store and manage business logic that is used by the organization. Business logic is typically system-specific software, artifacts, and/or data that encodes and represents real-world business rules and business objects. Organizations of all kinds use BDMS to track, verify and ensure that every decision is based on the most up-to-date rules and policies.

An example of another type of computerized decision management system known as an Operational Decision Management system (ODM) is the Operational Decision Manager™ by the IBM® Corporation or another decision management system based on the platform of the former ILOG Corporation of France. An ODM system such as Operational Decision Manager™ provides a computerized platform for an organization to capture, automate and govern frequent, repeatable business decisions. An organization uses the platform for managing and executing business rules and business events to help make decisions faster, improve responsiveness, minimize risks and seize opportunities. ODM systems use their own system-specific software, artifacts, and/or data to represent business rules and information.

Some organizations, especially large organizations with large numbers of subdivisions and/or functions and older organizations with legacy systems in place may employ more than one different type of computerized decision management system. Problems arise for such organizations when they desire to allocate or share decision management functions, processes, or procedures across different computerized decision management systems, but the different decision management systems cannot communicate with each other—for example, because each system represent the same or similar business information, rules, processes, flows, etc. in different system-specific formats as different artifacts or the like.

Accordingly, it is desirable to develop improved systems, methods and techniques for enabling automatic communication and cross use between disparate computerized decision management systems.

BRIEF SUMMARY

This disclosure provides embodiments of systems, devices, methods and articles of manufacturer for providing a communication channel between two disparate decision management systems. Various embodiments of the systems and devices may include a first communications link to a first decision management system; a second communications link to a second decision management system; a memory containing instructions; and a processor, operably coupled to the memory, that executes the instructions to perform specific operations that implement functionality consistent with the invention. Various embodiments of the systems, devices, methods, and articles of manufacturer may perform operations including receiving, from the first decision management system, a first plurality of artifacts that defines a first set of logic for a decision and that is executable by the first decision management system, wherein the first plurality of artifacts includes a top-down decision flow artifact; converting the first plurality of artifacts from the first decision management system into a second plurality of artifacts that defines a second set of logic for the decision, that is equivalent to the first set of business logic, and that is executable by the second decision management system, wherein the converting comprises creating a bottom-up rule flow artifact that is equivalent to the top-down decision flow artifact; and communicating the second plurality of artifacts to the second decision management system, which executes the second plurality of artifacts.

Other aspects include embodiments wherein the first plurality of artifacts includes a rule family artifact; and wherein converting the first plurality of artifacts further comprises: converting the rule family artifact into a decision table artifact that is executable by the second decision management system. Other aspects include embodiments wherein the first plurality of artifacts includes a glossary artifact; and wherein converting the first plurality of artifacts further comprises: converting the glossary artifact into a business object model artifact that is executable by the second decision management system. Other aspects include embodiments wherein converting the first plurality of artifacts further comprises: converting the glossary artifact into a vocabulary artifact that is used by the second decision management system.

Still other aspects include embodiments wherein the operations further comprise: accessing a reference glossary; identifying a data element in the glossary artifact that is not in the reference glossary; and creating a new data element in the business object model artifact that is equivalent to the data element. Other aspects include embodiments wherein the first decision management system is a business decision management system (BDMS) and/or wherein the business decision management system is a Sapiens DECISION™ system, and/or wherein the second decision management system is an operational decision management (ODM) system, and/or wherein the operational decision management (ODM) system is an IBM Operational Decision Manager™ system.

Yet other aspects include embodiments wherein the operations further comprise: detecting an error in the first plurality of artifacts from the first decision management system for errors; and reporting the error to a user. Other aspects include embodiments wherein the operations further comprise: storing the second plurality of artifacts in a repository; retrieving the second plurality of artifacts from the repository; and modifying the second plurality of artifacts to correspond to another plurality of artifacts receive from the first decision management system. Still other aspects include embodiments wherein communicating the second plurality of artifacts to the second decision management system comprises: deploying the second plurality of artifacts to the second decision management system such that the second plurality of artifacts can be executed by the second decision management system.

It is to be understood that both the foregoing general description and the following detailed description are exemplary and explanatory only and are not restrictive of the invention, as claimed.

Additional features, implementations, and embodiments consistent with the invention will be set forth in part in the description which follows, or may be learned by practice of the invention. The metes and bounds of the invention will be defined by means of the elements and combinations particularly pointed out in the appended claims.

BRIEF DESCRIPTION OF THE DRAWINGS

The accompanying drawings, which are incorporated in and constitute a part of this specification, illustrate embodiments of the invention and together with the description, serve to explain the principles of the invention. In the figures:

FIG. 5 shows a representation of an ODM glossary data structure and its conversion to equivalent ODM artifacts, consistent with embodiments of the invention;

FIG. 6B is an example of a Reference Glossary data structure used by a communication adaptor to produce ODM artifacts, consistent with embodiments of the invention;

FIG. 6C is an example of an ODM BOM data structure produced by an adaptor for communication between a BDMS and an ODM, consistent with embodiments of the invention;

FIG. 6D is an example of an ODM Vocabulary data structure produced by an adaptor for communication between a BDMS and an ODM, consistent with embodiments of the invention;

FIG. 7D is another example of an ODM Decision Table data structure produced by an adaptor for communication between a BDMS and an ODM, consistent with embodiments of the invention;

FIG. 7E is yet another example of an ODM Decision Table data structure produced by an adaptor for communication between a BDMS and an ODM, consistent with embodiments of the invention;

DETAILED DESCRIPTION OF THE EMBODIMENTS

Reference will now be made in detail to exemplary embodiments of the invention, examples of which are illustrated in the accompanying drawings. Wherever convenient, the same reference numbers will be used throughout the drawings to refer to the same or like parts.

Various embodiments consistent with the invention provide systems, methods, and computer program products for an adaptor for enabling communication between two or more disparate computerized decision management systems, such as a Business Decision Management System and an Operational Decision Management system. Currently, Business Decision Management Systems and Operational Decision Management system have no means to communicate with each other. Thus, they must be operated as standalone systems, and the benefits of work done on a Business Decision Management System, such as the Sapiens DECISION™ system, cannot be used or realized by an Operational Decision Management system, such as the IBM Operational Decision Manager™. Embodiments and implementations consistent with the present disclosure provide an adaptor that is a communication channel between two decision management systems, such as a Business Decision Management System and an Operational Decision Management system. The adaptor takes the outputs of the Business Decision Management System and ports, adapts, translates or otherwise converts it into inputs that it sends to, and can be utilized by the Operational Decision Management system, such that the business logic that is developed on and is executable on the Business Decision Management System is communicated to and executable on the Operational Decision Management system.

Figure 1A:
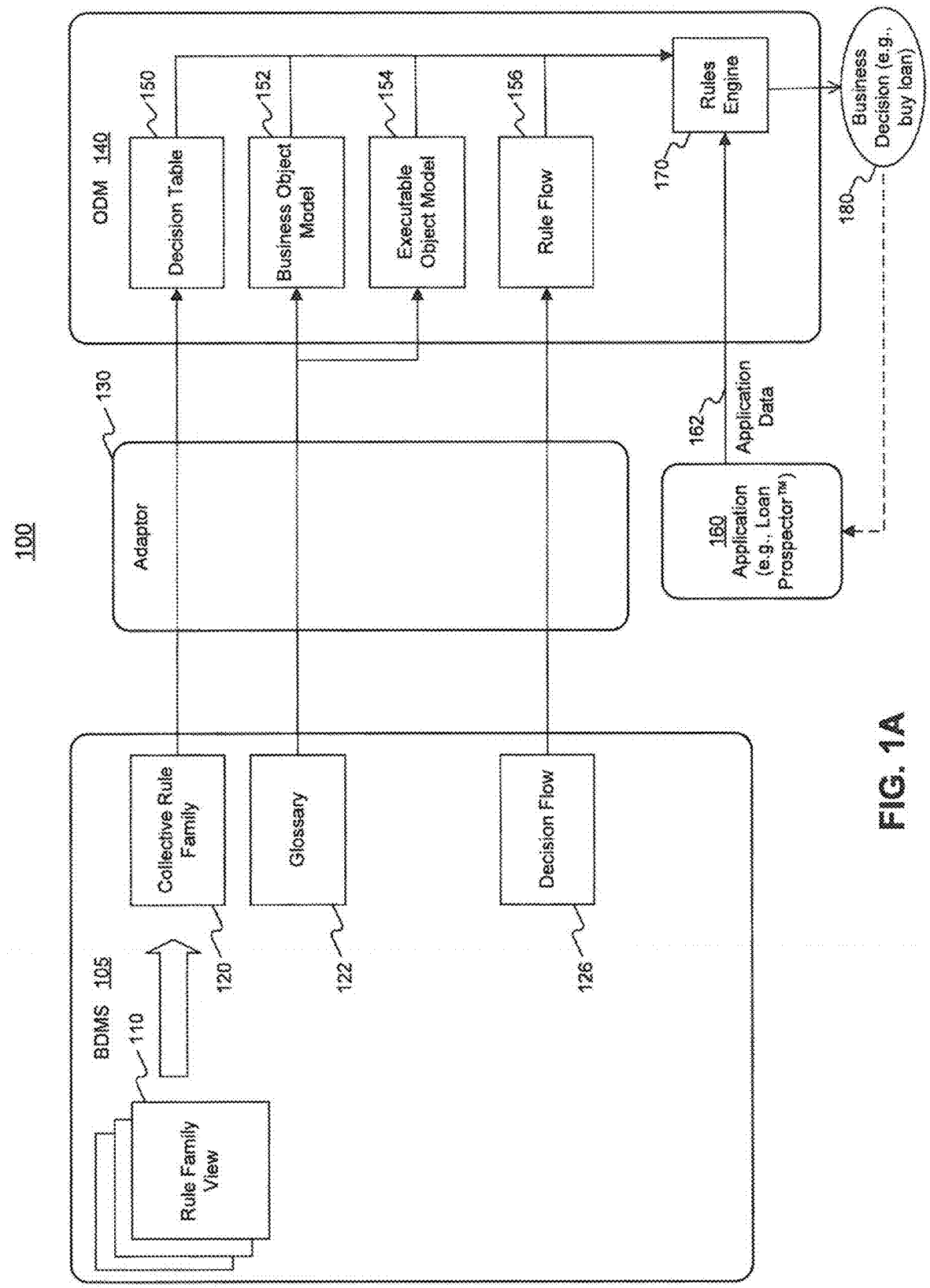
FIG. 1A illustrates an example of a system for enabling communication between disparate computerized decision management systems, consistent with embodiments of the invention.

FIG. 1A illustrates an example of a system 100 for enabling communication between disparate computerized decision management systems, consistent with embodiments of the invention. As shown, an adaptor 130 receives inputs from a Business Decision Management System (BDMS) 105 over a communication link, such as a digital network (not shown) and creates, from the inputs, outputs that are provided via a communication link (not shown) to and received by an Operational Decision Management system (ODM) 140. The adaptor 130 functions to provide a new communication channel between the two systems and translates, converts, recreates, or otherwise adapts the business logic that is usable by the BDMS 105 into business logic that is usable by the ODM 140. In various embodiments, the adaptor may read the output artifact(s) 120-126 (e.g., files) from the BDMS 105 (e.g., DECISION™) and generate equivalent artifact(s) 150-156 (e.g. files) containing data, data structures, code, etc. conforming to the requirements of, and used during execution by, the ODM 140 (e.g., Operational Decision Manager™ by IBM). Thus, a user can author business rules or business logic using the BDMS 105 (e.g., DECISION™) and automatically execute the business rules, after automatic translation by the adaptor 130, on the ODM 140 (e.g., Operational Decision Manager™ by IBM).

The artifacts may represent business logic and may be in the form of, for example, data files, tables, data structures, code, or the like. In some embodiments, the artifacts may be related to business logic and business rules modeling and development, where human business analysts create the business rules, glossary terms and decision flows (120-126) using DECISION™ and those business rules are analyzed and recreated by the adaptor 130 into new, functionally equivalent artifacts (150-156) that are communicated to, and for use by, an ODM 140, such as Operational Decision Manager™ by IBM, providing communication and machine-level interaction between the two systems that did not exist before.

In the example shown, the BDMS 105 includes one or more rule family views 110. In various embodiments, the rule family view 110 represents a variance of a rule family. For example, the BDMS 105 may include a rule family to represent Debt to Income (DTI) compliance rules, and the BDMS 105 may be configured to provide a view of the DTI rule family for loans that don't qualify to any offering programs available from a financial institution, such as Freddie Mac. In another example, the BDMS 105 may also or alternatively be configured to provide a view (variance) of the DTI rule family for loans that qualify for a specific program, such as the "Home Possible™" program offered by Freddie Mac.

In various embodiments, the adaptor 130 may be implemented as a specially programmed computer or computing platform dedicated to providing a communication channel between the BDMS 105 and the ODM 140. In some embodiments, the adaptor 130 may be implemented in Java™ on a J2EE framework. In various embodiments, the BDMS 105 may be a commercial, off-the-shelf product, such as the Sapiens DECISION™ product, and the ODM 140 may also be a commercial, off-the-shelf product, such as the IBM Operational Decision Manager™ product. In other embodiments, one or both of the BDMS 105 and the ODM 140 may be custom products or systems.

In various embodiments, the adaptor 130 may utilize a generic mapping model for data transfer and may exchange artifacts between the BDMS 105 and ODM 140. The adaptor 130 may also automatically convert the artifacts from the BDMS 105 into artifacts that are executed by the ODM 140. In other words, the adaptor 130 consumes artifacts that come in a first specific format (e.g., a certain data structure, table format, or the like) from the BDMS 105 and the adaptor 130 produces artifacts in a second specific format (e.g., another data structure, table format, or the like) that are communicated to and consumed by the ODM 140 (e.g., run on the rules engine 170 of the ODM 140).

As shown in the example of FIG. 1A, the artifacts of the BDMS 105 may include a collective rule family (or families) 120, which the adaptor 130 may translate or convert into a decision table(s) 150 that is transmitted or communicated to and utilized by the ODM 140 in its entirety or incremental. In various embodiments, the rule family 120 may be translated fully or partially.

In some embodiments, the adaptor 130 may accept and process other types of inputs in addition to or as an alternative to, the standard outputs created by the BDMS 105. In some such embodiments, the adaptor 130 may accept business rules or business logic in the form of collective rule family (or families), and adaptor 130 may produce BAL (Business Action Language) specific business rule(s) or mapping rule(s) (translation rule(s)) from the inputs 706 as shown in FIG. 7F to create artifact 151 (e.g. files) that can be used during execution by the ODM 140. FIGS. 7G and 7H are examples of ODM 141 BAL rules 707, 708 which are converted using the Collective Rule Family input as shown in FIG. 7F provided by the BDMS 105. In various embodiments, the adaptor 130 can generate output as shown in FIG. 7E only or can also generate output as shown in FIGS. 7G and 7H.

The BAL format is another way of expressing business rules. In the case of multiple rules with the same condition and action, where just the values are different, it may be more efficient to use a decision table to represent and communicate them in tabular format to the ODM 140, such as the rules:

(1) If LTV>35% THEN set LTV Compliance as "Compliant," and (2) If LTV<35% THEN set LTV Compliance as "Not-Compliant."

The artifacts of the BDMS 105 may further include a glossary (or glossaries) 122, which the adaptor 130 may translate or convert into a Business Object Model 152 (BOM) and/or an Executable Object Model 154 (XOM) that is transmitted, communicated, or provided to and utilized by the ODM 140. The adaptor 130 receives from the BDMS 105 the glossary 122, which is a list of attributes used by the rule families 120 in the BDMS 105.

The artifacts of the BDMS 105 may further include a decision flow(s) 126, which the adaptor 130 may translate or convert into a rule flow(s) 156 that is transmitted to and utilized by the ODM 140 and that provides a systematic rules execution order to trigger applicable rules based on the business data input to the ODM 140 during operation.

In various embodiments, the adaptor 130 may also verify that the output of BDMS 105 is compatible and correct for use by the ODM 140. For example, the adaptor 130 may verify that the variable names (e.g., "loan_purpose") used in the rules produced the BDMS 105 are valid variable names for use by the rules engine 170 of the ODM 140, for example, by checking against a reference list (e.g. a reference glossary or dictionary) of valid variable names for the ODM 140 and notifying a user of any variable names that are not on the list.

Figure 10:
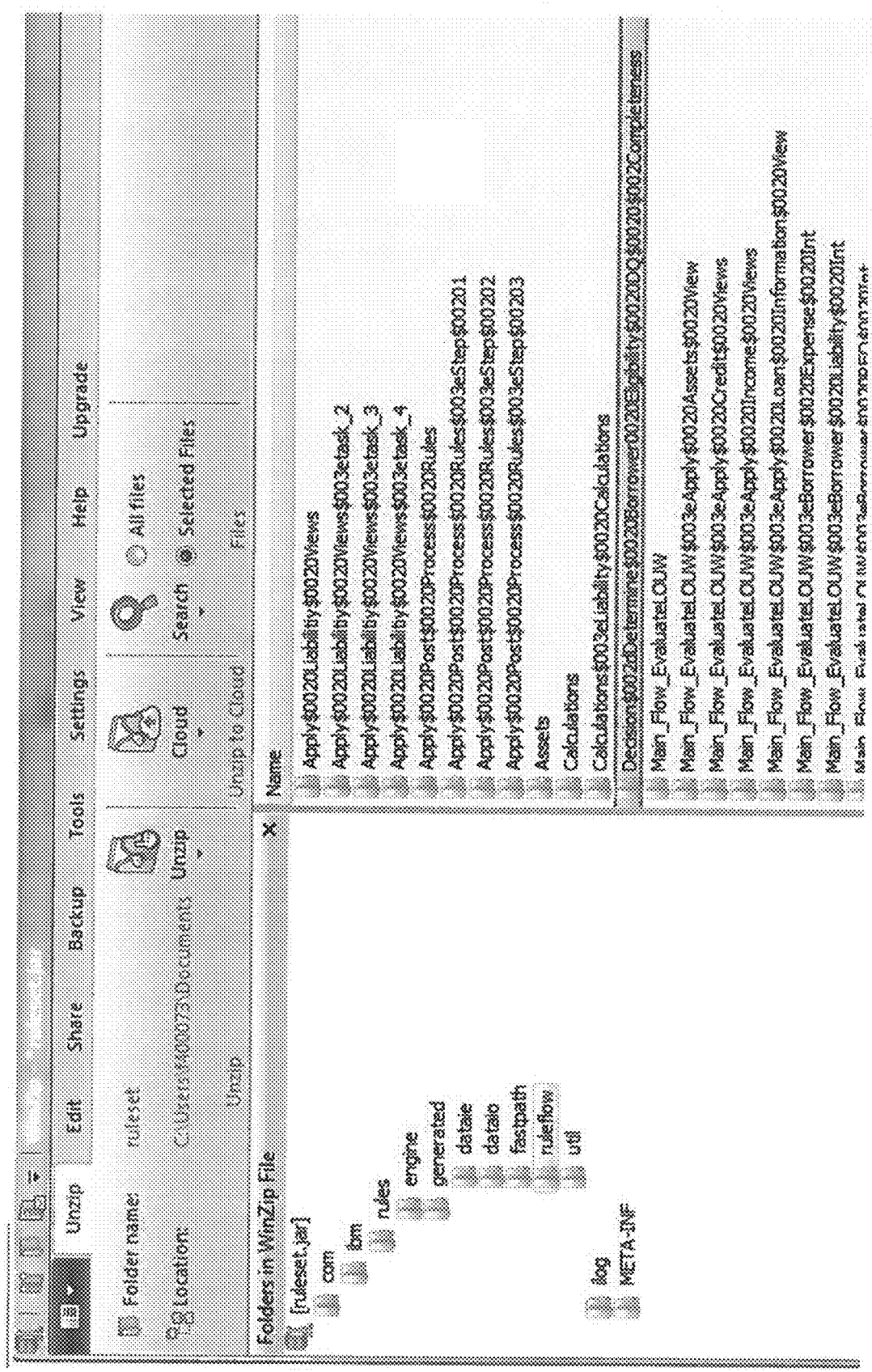
FIG. 10 shows an example of a ruleapp file, which may be output or transmitted by an adaptor, consistent with embodiments of the invention.

In some embodiments, the artifacts generated through the adaptor 130 may be packaged into one executable RuleApp file (e.g., a deployable jar file) that can be transmitted or otherwise communicated to and deployed in the ODM 140, for example, by inputting the RuleApp file via an application programming interface (API) of the ODM 140 that is invoked by the adaptor 130. FIG. 10 shows an example of a RuleApp file, which may be output by an adaptor, consistent with embodiments of the invention. In some embodiments, the adaptor 130 may produce a report (not shown) of the changes generated for deployment, which may be used for auditing and verification purposes by a user of the adaptor 130.

In the embodiment shown, the ODM 140 receives business data 162 from a business application 160 (e.g., the Loan Prospector™ business application by Freddie Mac), and outputs a business decision 180 (e.g., purchase the loan described in the business data 162). The ODM 140 contains a rules engine 170 that processes the business data 162 according to a set of business rules and business logic (e.g., a business model) represented by the artifacts 150-156, which were communicated from the BDMS 105 via the channel provided by the adaptor 130.

The Loan Prospector™ business application 160 may provide as many as 300-400 different pieces of data in the business data 162, such as data describing the borrower's name, data describing the borrower's social security number, data describing the borrower's nationality, data describing the borrower's income, data describing the borrower's credit score, data describing the borrower's assets, data describing the borrower's liabilities, data describing the property price, data describing the desired loan amount, data describing the loan's interest rate, and the like. The rules engine 170 may apply or execute rules in a specific order, which are specified by the artifacts 150-156, on each or some of the pieces of data from the business data 162. The rules 170 may produce a business decision 180, which may, in some embodiments, be communicated as output data that may be fed back or input to the business application 160 that supplied the input business data 162. As noted above, an example of a business decision 180 may be data sent to the Loan Prospector™ business application 160 indicating that a loan is approved along with data indicating the reasons for approval, or data sent to the Loan Prospector™ business application 160 indicating that a loan is denied along with data indicating the reasons for denial (e.g., the business rules with which the loan does not comply).

One of ordinary skill will recognize that the components and implementation details of system 100 are examples presented for conciseness and clarity of explanation. Other components, implementation details, and variations may be used. For example, the adaptor 130 may be integrated with the BDMS 105 in some embodiments, such that the standard output from the BDMS 105 is automatically converted into or recreated in a format that is communicated and input into and executed by the ODM 140.

Figure 1B:
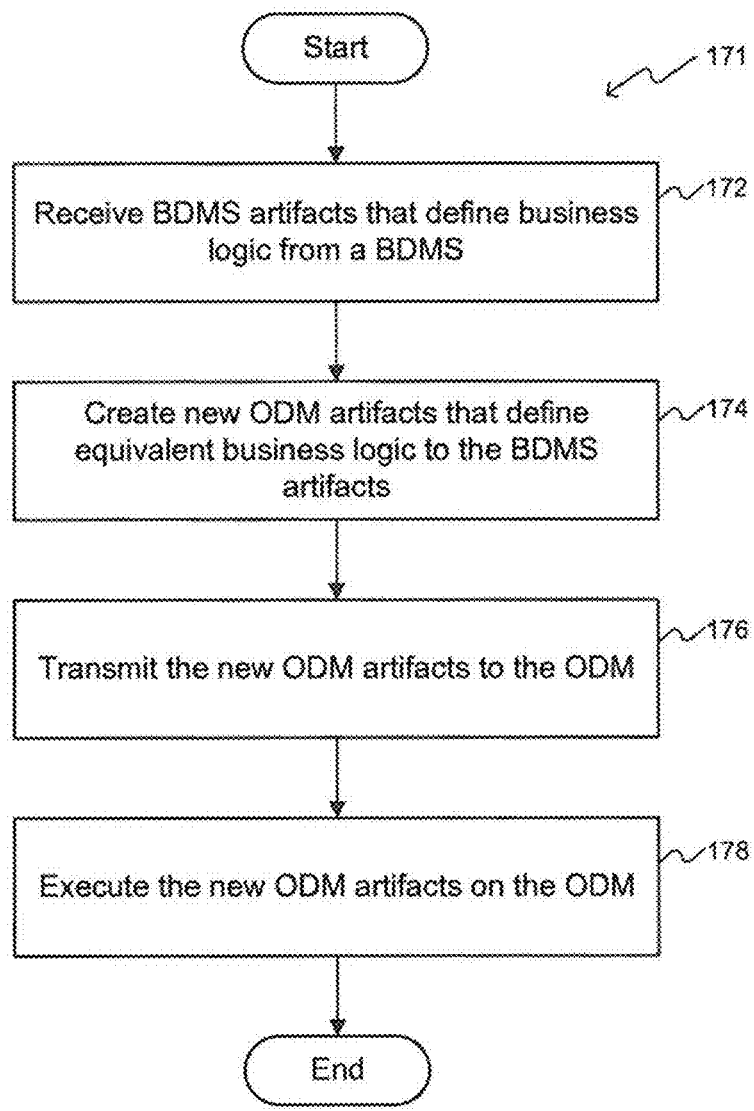
FIG. 1B is a flowchart of an example of a process for enabling communication between disparate computerized decision management systems, consistent with embodiments of the invention.

FIG. 1B is a flowchart of an example of a process 171 for enabling communication between disparate computerized decision management systems, consistent with embodiments of the invention. In various embodiments, some or all of the process 171 may be performed by a specialized device(s), such as a specially programmed computing device, a hardware-only system, or by a system that is a hybrid of the two. In various embodiments, the process 171 may be implemented by a processor that is included in the adaptor 130 of FIG. 1A.

In the embodiment shown in FIG. 1B, process 171 begins by receiving BDMS artifacts that define business logic from a BDMS (operation 172). For example, if implemented by the adaptor 130, the adaptor may retrieve artifacts 120-126 from the BDMS 105, where the artifacts 120-126 define business logic, business rules, and procedures for automated business decisions, as discussed in detail throughout this disclosure.

Next, the process 171 creates new ODM artifacts that define equivalent business logic to the BDMS artifacts obtained in operation 172 (operation 174). In various implementations, operation 174 may analyze the BDMS artifacts and convert them into equivalent ODM artifacts. For example, a BDM collective rule family (or families) 120 may be translated into or otherwise expressed as a business-logically equivalent ODM decision table(s) 150, or a BDMS decision flow(s) 126 may be translated into or otherwise expressed as a business-logically equivalent ODM rule flow(s) 156, etc.

At operation 176, the process 171 transmits, deploys, or otherwise communicates the newly created ODM artifacts to the ODM, providing a new communication means or channel between the BDMS and the ODM. For example, the process 171 may send a BDM collective rule family 120 that it created to the ODM 140, or may send a newly created ODM rule flow 156 to the ODM 140, for use (e.g., execution) by the ODM 140.

At operation 178, the process 171 completes with executing, by the ODM, the new ODM artifacts. The new ODM artifacts provide for the ODM 140 equivalent business logic to the BDMS artifacts obtained in operation 172 in a format that is executable by the ODM 140, unlike the format of the BDMS artifacts. As discussed above, in various embodiments, the ODM 140 may execute the business logic to operate on data provided by, and to achieve business goals in conjunction with, an outside business application 160.

One of ordinary skill will recognize that process 171 is presented for conciseness and clarity of explanation and that operations may be added to, deleted from, reordered, or modified within process 171 without departing from the principles of the invention.

Figure 1C:
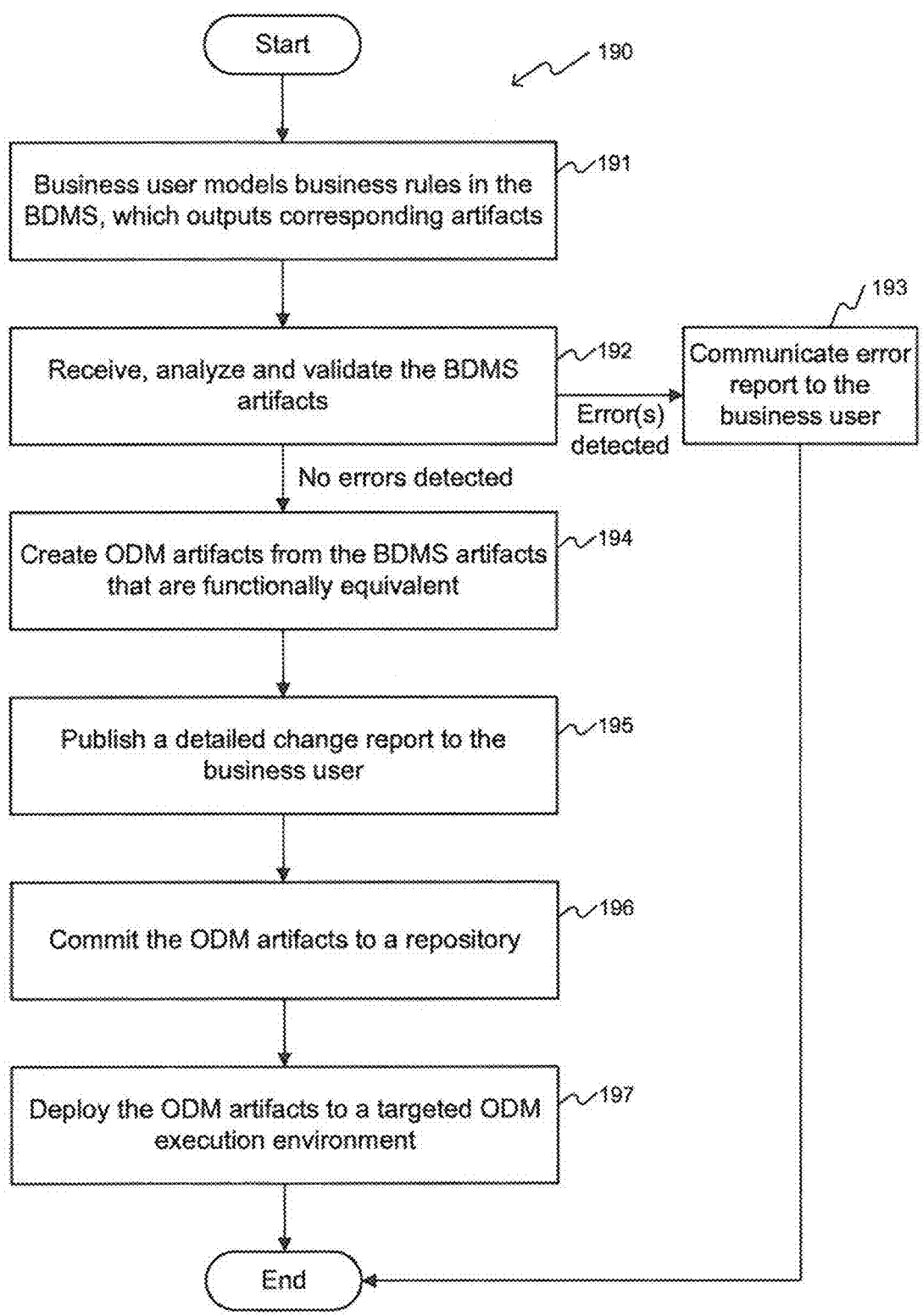
FIG. 1C is a flowchart of an example of another process for enabling communication between disparate computerized decision management systems, consistent with embodiments of the invention.

FIG. 1C is a flowchart of an example of another process 190 for enabling communication between disparate computerized decision management systems, consistent with embodiments of the invention. In various embodiments, some or all of the process 190 may be performed by a specialized device(s), such as a specially programmed computing device, a hardware-only system, or by a system that is a hybrid of the two. In various embodiments, various operation in the process 190 may be implemented by a processor that is included in the adaptor 130 of FIG. 1A.

In the embodiment shown in FIG. 1C, process 190 begins with a business user models or creates business rules, for instance using the BDMS 105 (operation 191).

At operation 192, the process 190 receives, analyzes, and validates the BDMS artifacts. For example, if implemented by the adaptor 130, the adaptor may receive or retrieve artifacts 120-126 from the BDMS 105, where the artifacts 120-126 define business logic, business rules, and procedures for automated business decisions, as discussed in detail throughout this disclosure. The adaptor 130 may then analyze and validate the BDMS artifacts, for instance, to identify validness of metadata associated to BDMS Artifacts, to identify missing artifacts, to identify missing information in each artifact, to identify any technical issues in processing the artifacts, and/or to identify modelling defects in the business rules. In various implementations, the operation 192 may also analyze and validate any existing ODM artifacts to detect errors.

If the operation 192 detects any error(s) after analyzing the BDMS artifacts, then the process 190 branches to operation 193 and communicates an error report to the business user detailing the detected error(s). The process 190 then stops, which results in no communication being established or taking place along the communication link provide by the adaptor 130 between the BDMS 105 and the ODM 140.

If, on the other hand, the operation 192 does not detect any error(s) in the BDMS artifacts, then the process 190 proceeds to operation 194 and creates ODM artifacts from the BDMS artifacts, where the ODM artifacts are functionally equivalent to the BDMS artifacts in terms of business logic. For example, in various implementations of this operation, the adaptor 130 may create a new (or update an existing) reference glossary (e.g., reference glossary 601) using the BDMS Glossary 122; may create a new (or update an existing) Execution Object Model 154 ODM artifact using the reference glossary 601; may create a new (or update an existing) Business Object Model 152 ODM artifact using the reference glossary 601; may create a new (or update an existing) Decision Table 150 ODM Artifact(s) using the Collective Rule Family(s) 120 BDMS artifact(s); and/or create a new (or update an existing) Rule Flow 156 ODM artifact(s) using the Decision Flow (126) BDMS artifact(s).

At operation 195, the process 190 publishes a detailed change report to the business user. For example, the adaptor 130 may create a communication that lists the ODM artifacts that it created or updated, and send, email, or otherwise provide the communication to the user.

At operation 196, the process 190 commits the ODM artifacts to a repository. For example, the adaptor 130 may place the created ODM artifacts in a database or local data storage structure from which the artifacts can be accessed, updated, and/or sent, transmitted or otherwise provided to the ODM 140.

At operation 197, the process 190 deploys, transmits, or otherwise communicates the ODM artifacts to a targeted ODM execution environment, such as the ODM 140, and then the process 190 ends. In some implementations of this operation 197, the adaptor 130 may build a specialized container, such as the ruleapp archive file shown in FIG. 10, which contains several ODM Artifacts that are executable by the targeted ODM execution environment, such as the ODM 140. The ODM 140 may receive or otherwise access the specialized container from the adaptor 130 and execute the business rules specified by the artifacts. In some embodiments, the adaptor 130 may also commit the ODM artifacts to a repository for later reuse or modification, as described above.

One of ordinary skill will recognize that process 190 is presented for conciseness and clarity of explanation and that operations may be added to, deleted from, reordered, or modified within process 190 without departing from the principles of the invention.

Figure 2:
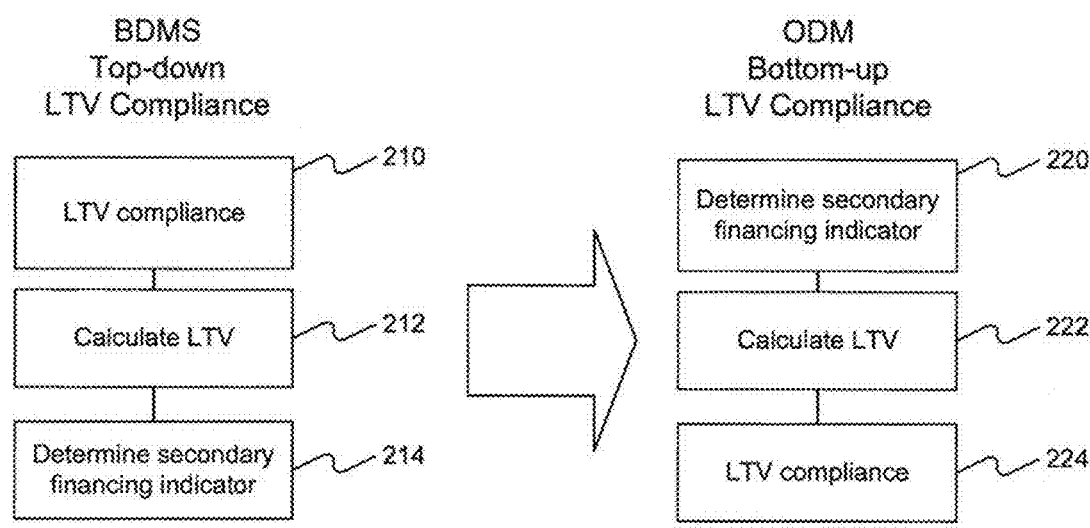
FIG. 2 is a block diagram of an example of a communication conversion strategy between disparate computerized decision management systems, consistent with embodiments of the invention.

FIG. 2 is a block diagram of an example of a communication conversion strategy between disparate computerized decision management systems, consistent with this disclosure. For the BDMS 105, business rules are processed and represented in artifacts (e.g., data structures) in a top-down fashion, as shown on the left. In this example, the BDMS 105 may be implementing business logic for a decision related to the LTV compliance of a mortgage loan or potential mortgage loan. As shown in FIG. 2, the BDMS 105 defined the process to determine LTV compliance in the top-down hierarchy shown using 210, 212 and 214. Using a top-down hierarchy BDMS defines the step 210 as LTV compliance which is the final decision, determined based on the intermediate step 212: Calculate LTV and this intermediate step 212 is determined based on the lower step 214: Secondary financing indicator.

More particularly for this example, at 210, LTV Compliance is determined, for example, by the rule: "if LTV is greater than or equal to 35%, then LTV compliance is determined as being compliant." At 212, the LTV value is calculated, for example, by the rule: "if secondary financing indicator is TRUE then LTV is set equal to 35%." And at 214, the value of the secondary financing indicator is determined, for example, by the rule: "if a second lien HELOC indicator is Populated and a third lien HELOC indicator is Populated then the secondary financing indicator is set to TRUE." In this example, the artifacts output by the BDMS 105 (e.g., a decision flow 126) may represent the business rules 210-214 in a top-down manner.

For the ODM 140, in contrast, business rules are processed and represented in data structures in a bottom-up fashion, as shown on the right. In this case, the artifacts used by ODM (e.g., a rule flow 156) represent and chain and execute the equivalent business rules 220-224 in a different manner that is reversed from the BDMS representation. In various implementations, the adaptor 130 converts the BDMS top-down representation of business logic into an ODM bottom-up representation such that the BDMS 105 can communicate with the ODM140, for example, as described with respect to the operation 194 of the process 190 of FIG. 1C.

Figure 3:
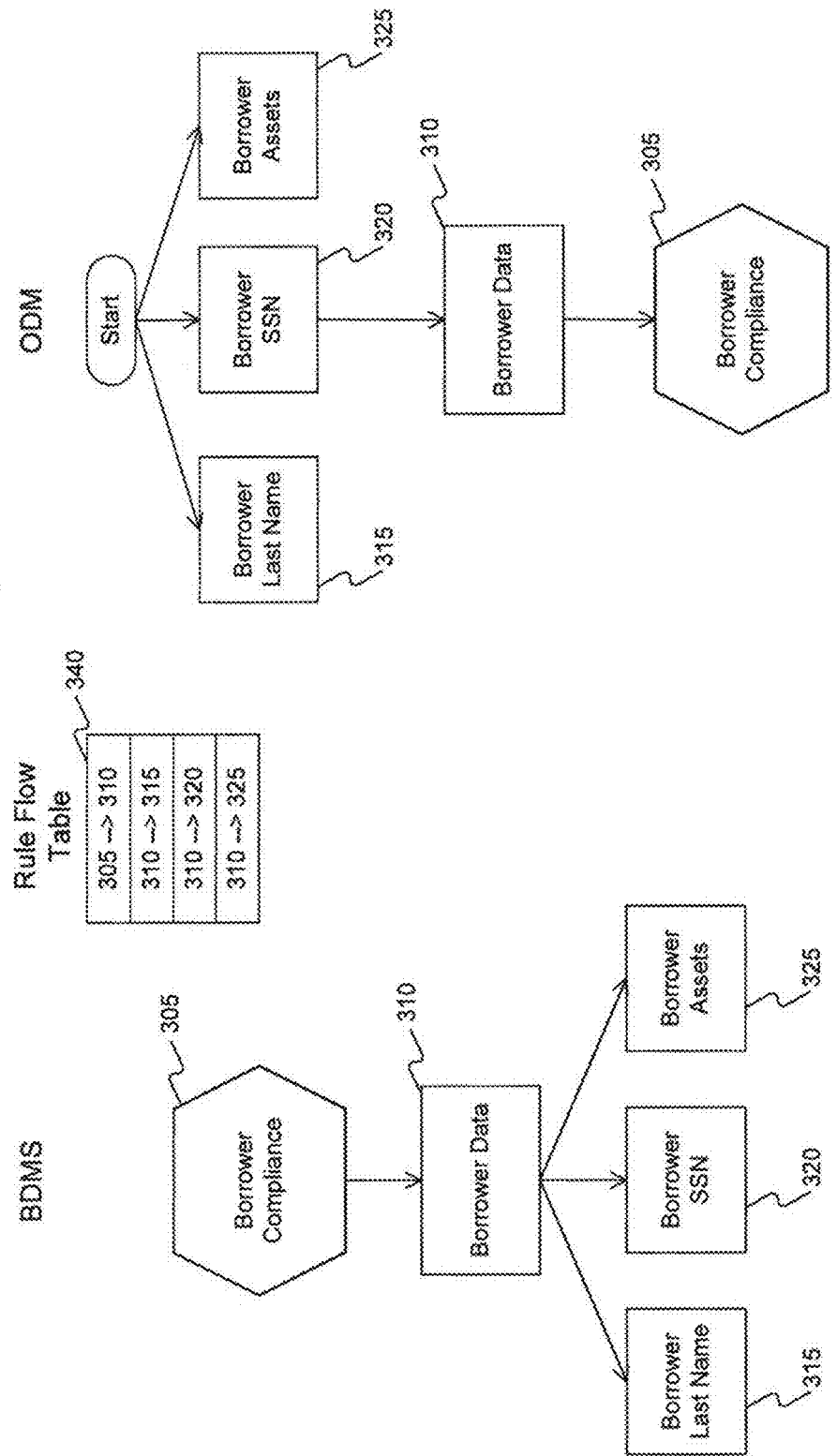
FIG. 3 is a diagram illustrating an example of a BDMS-to-ODM communication conversion process, consistent with embodiments of the invention.

FIG. 3 is a diagram illustrating an example of a BDMS-to-ODM communication and conversion process, consistent with this disclosure. As shown on the left, a business rule or business model in represented in the BDMS 105 in a top-down manner. In the example shown, the business rules relate to borrower data for a loan application to make a determination or decision regarding borrower compliance 305; e.g., whether or not the borrow data, and thus the borrower it describes, meets the business requirements set by a lender in order for the lender to offer a loan to the borrower.

In this example, the BDMS 105 structures or defines the execution order of the rules in a tree fashion, where across the bottom are the executable rules that work with and evaluate particular business data, such as a rule or decision table that validates the borrower's last name 315, a rule that verifies the borrower's SSN 320, and a rule that verifies the borrower's assets 325. For example, the borrower's last name rule 315 may be implemented with logic or code similar to "IF last_name=null, THEN indicate last name format error." For another example, the borrower's SSN rule 320 may be implemented with logic or code similar to "IF length of the SSN< >9 digits, THEN indicate SSN format error."

At the next level up, the borrower data rule 310 may include logic that requires as in input(s) the output(s) or conclusions of one or more of the lower level rules 315-325. For example, the borrower data rule 310 may be implemented with logic or code similar to:

IF NOT SSN format error (from 320) THEN
federal_SSN=fetch the federal SSN corresponding to the borrower's
LAST NAME from the federal government database;
IF federal_SSN< > borrower SSN THEN indicate SSN validation error;
ENDIF.

At the top level, the borrower compliance rule 305 may include logic that requires as in input(s) the output(s) or conclusion(s) of one or more of the lower level rules 310-325. For example, the borrower compliance rule 305 may be implemented with logic or code similar to "IF error indications=0, THEN borrower complies."

As represented by a rule flow file 340, the output of the BDMS 105 may include data mapping the relationships, flow, and/or order of execution of the BDMS rules. As shown in the rule flow file 340, the flow is represented in a top-down manner. The rule flow file 340 specifies the hierarchy of the dependencies of rules, and the reverse order or sequence (when read from the top down) in which the rules must be executed in order to correctly perform the business decision on the BDMS 105.

In various embodiments, the output of the BDMS 105 is organized in a top-down fashion as shown on the left side in FIG. 3, and written to a file. In order to implement a set of rules 305-325 in the ODM 140, the adaptor 130 recreates or otherwise reorganizes the data from the bottom up before communicating it to the ODM 140, as shown on the right side in FIG. 3, so that the is compatible with the ODM 140 and flows correctly and equivalently when processed by the ODM 140. In various embodiments, the adaptor 130 may use the information in the rule flow file 340 to help create the correct relationships between rules in the bottom-up format needed by the ODM 140, as represented on the right of FIG. 3.

Figure 4:
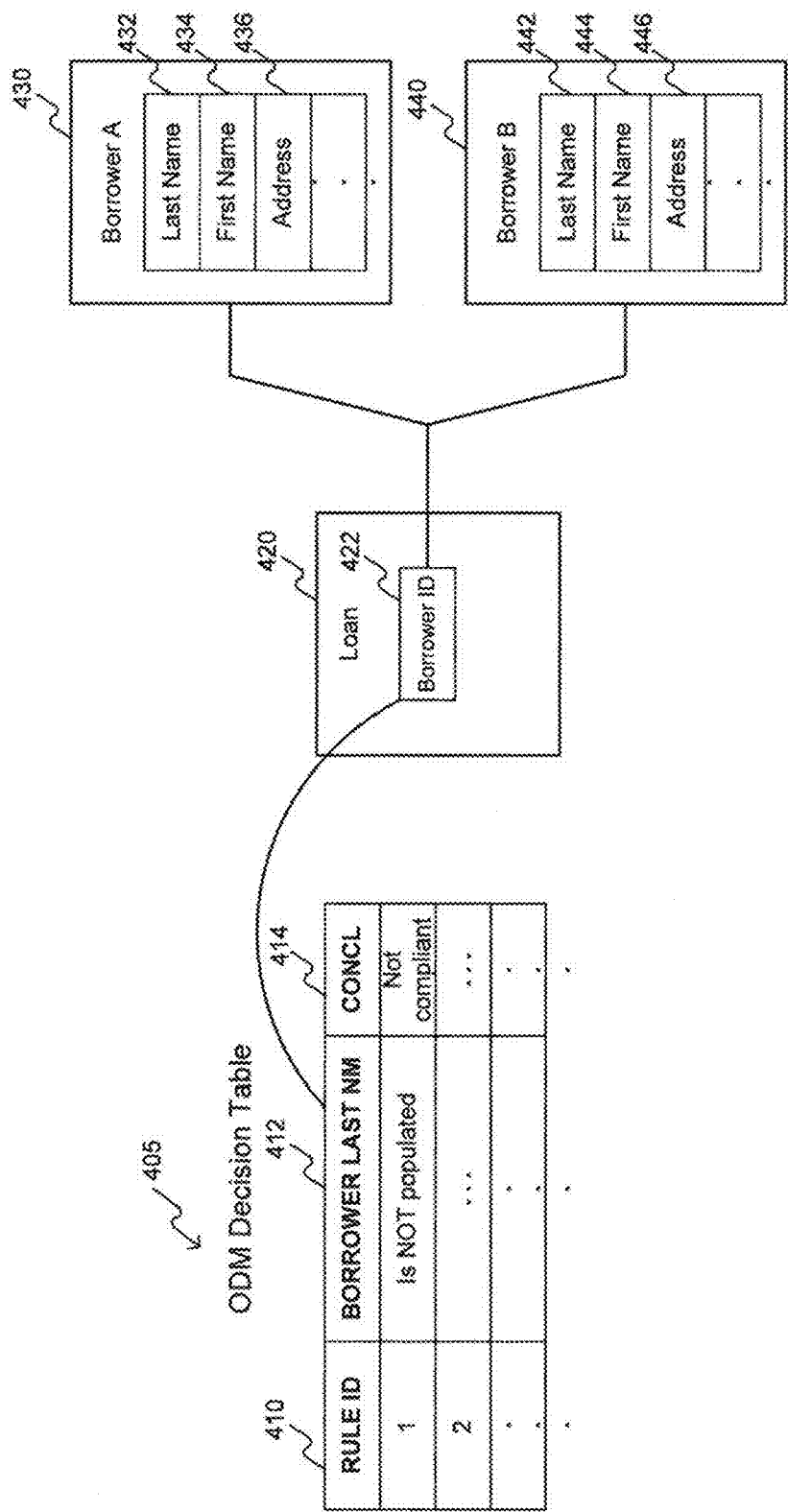
FIG. 4 is a diagram illustrating an example of a decision table produced by a communication adaptor for use by ODM, consistent with embodiments of the invention.

FIG. 4 is a diagram illustrating an example of a decision table 405 produced by a communication adaptor 130 for use by the ODM 140, consistent with this disclosure. The example of a ODM decision table 405 (e.g., which is functionally equivalent to and generated from a BDMS rule family 120) shown includes a rule ID 410, which has the value 1 for the rule in the first row; a rule definition 412, which defines a variable(s) to analyze, in this case "Borrower Last Name", and a condition to test, in this case "is not populated" (e.g., blank, null, or no information, for example, in a mortgage application that is missing a last name) in the first row. The ODM decision table 405 also includes a conclusion 414 indicating a decision outcome if the variable matches or otherwise meets the condition, in this case the conclusion is "not compliant" in the first row for a loan associated with a "Borrower Last Name" that "is not populated."

In various embodiments, the adaptor 130 may receive a BDMS decision flow 126 (which may have its business logic represented in a different way, such as an XML data structure) as input and create an equivalent ODM-compatible data representation, such as the ODM decision table 405 (or other data structure) that is communicated to and executes on the ODM 140 to perform the equivalent task, such as processing a mortgage application or a portion thereof.

In various embodiments, the created ODM-compatible decision table 405 is tied, by the adaptor 130, to a data model that allows it to execute correctly in the ODM 140. In the example shown, the borrower last name 412 from the decision table 405 is associated by the adaptor 130 to a loan data structure 420, which is an example of a data model representing a loan that is currently being processed by the ODM 140. More specifically, the borrower last name 412 from the table 405 may be associated with a borrower ID data structure 422 within or associated with the loan data structure 420.

As shown, the borrower ID data structure 422 may be associated with one or more borrower data structures 430 and 440, for example, in the case of loans that have co-borrowers. The borrower data structure 430 may include or be associated with data describing a first borrower ("Borrower A)," such as last name 432, first name 434, address 436, and the like. Similarly, the borrower data structure 440 may include or be associated with data describing a second co-borrower ("Borrower B"), such as last name 442, first name 444, address 446, and the like.

Based on the data model 420-440, the adaptor 130 may create ODM artifacts, (such as business object models 152, executable object models 154 and/or rule flows 156), that properly execute the rule(s) specified by the ODM decision table 405 in the context of the data model 420-440. For example, the ODM artifacts may specify that the ODM 140 validate the last name 432 of Borrower A 430, and then check for another borrower. Upon finding Borrower B 440, the ODM 140 validates the last name 442 of Borrower B 440, and then checks for another borrower. Upon finding no other borrowers, the ODM 140 may output a conclusion 414 for the rule represented by the decision table 405 according to whether both the last name 432 of Borrower A 430 and the last name 442 of Borrower B 440 were or were not populated. Thus, the ODM artifacts produced by the adaptor 130 take into account more than just the decision table 405 in order to properly execute rules in ODM 140 as modelled in BDMS.

FIG. 5 shows a representation of an ODM glossary data structure 505 and its conversion by the adaptor 130 into equivalent ODM artifacts 520-540, consistent with this disclosure. The glossary 505 is a list of business attributes, elements, data points or variables which are defined for use by the BDMS 105 and on which rules can be written. In the example shown, the glossary 505 includes a "borrower last name" data element 507, a "borrower social security number" data element 509, a "loan-to-value ratio" data element 511, a "total loan-to-value ratio" data element 513, and a "borrower data conclusion" data element 515.

The items in the glossary 505 are used by the rule families 120 in the BDMS 105. In various embodiments, when the adaptor 130 processes a glossary 505 (see also 122), the adaptor 130 may identify attributes or data elements in the glossary 505 that are newly added so that those new attributes can be flagged as needing to be added to the ODM 140 and processed accordingly by the adaptor 130. In various embodiments, the adaptor 130 may compare the data elements in the glossary 505 to a standard or reference set of data (e.g., a reference glossary 601) to identify the newly added data elements as, for example, elements that are not in the reference set. In loan-related implementations, the reference set of data may be, for example, the Uniform Loan Delivery Dataset (ULDD), which is the common set of data elements required by financial institutions, such as Freddie Mac and Fannie Mae, for single-family loan deliveries and business decisions related to single-family loan.

For some newly added attributes of the glossary 500, the adaptor 130 can automatically create new, corresponding data elements and data structures for adding to and use by the ODM 140. In particular, the adaptor 130 can do this for newly added "interim" attributes or "interim" glossary elements, which are intermediate values or variables or conclusions that are calculated or output by a rule and whose only purpose is to be used in a subsequent calculation or by a subsequent rule.

In the example shown in FIG. 5, the "borrower data conclusion" data element 515 is an interim glossary element, and when the adaptor 130 identifies this element as new, it creates or modifies artifacts to form an equivalent interim element in the ODM 140. For example, the adaptor 130 may update the ODM 140's XML Schema Definition (XSD) file 520; update the ODM 140's Business Object Model (BOM) file 530; and update the ODM 140's vocabulary file; all in a manner that mimics the storage and usage of the "borrower data conclusion" data element 515 from the glossary 505 of the BDMS 105.

In various embodiments, the adaptor 130 may create a decision table that is used by the ODM 140, (e.g., similar to the decision table 405 of FIG. 4), wherein the "borrower data conclusion" interim glossary data element 515 is a conclusion, (e.g., similar to the conclusion 414 of the decision table 405 of FIG. 4).

As mentioned above with reference again to FIG. 1A, the adaptor 130 may generate a single file (see FIG. 10) that contains the artifacts (such as artifacts 520-540 that are executable by the ODM 140, which may be known as a RuleApp jar (archive) file or a rule set jar (archive) file, which the adaptor 130 transmits, deploys, or otherwise communicates to the ODM 140's execution environment. In such embodiments, the RuleApp jar file contains items or artifacts, such as the translated rule family(s) 120, the glossary 122, and the decision flow(s) 126, in a format that is executable by the ODM 140. The RuleApp jar file acts as a standalone entry point for executing a particular set or group of policies or business rules. The adaptor 130 may deploy the RuleApp jar file into the ODM 140's execution environment, such that it is ready for execution by the Rules Engine 170. When a business application 160 (e.g. the Loan Prospector™ application) requests execution and provides data to be processed by the business rules, then the ODM 140 starts executing the decision flow(s) 126, which are represented in the ODM artifacts from the RuleApp jar file, and which orchestrate decision table(s) or business rules execution in a manner and sequence as were originally specified by the BDMS models.

Figure 6A:
FIG. 6A is an example of a BDMS Glossary data structure, consistent with embodiments of the invention.
Figure 6D:
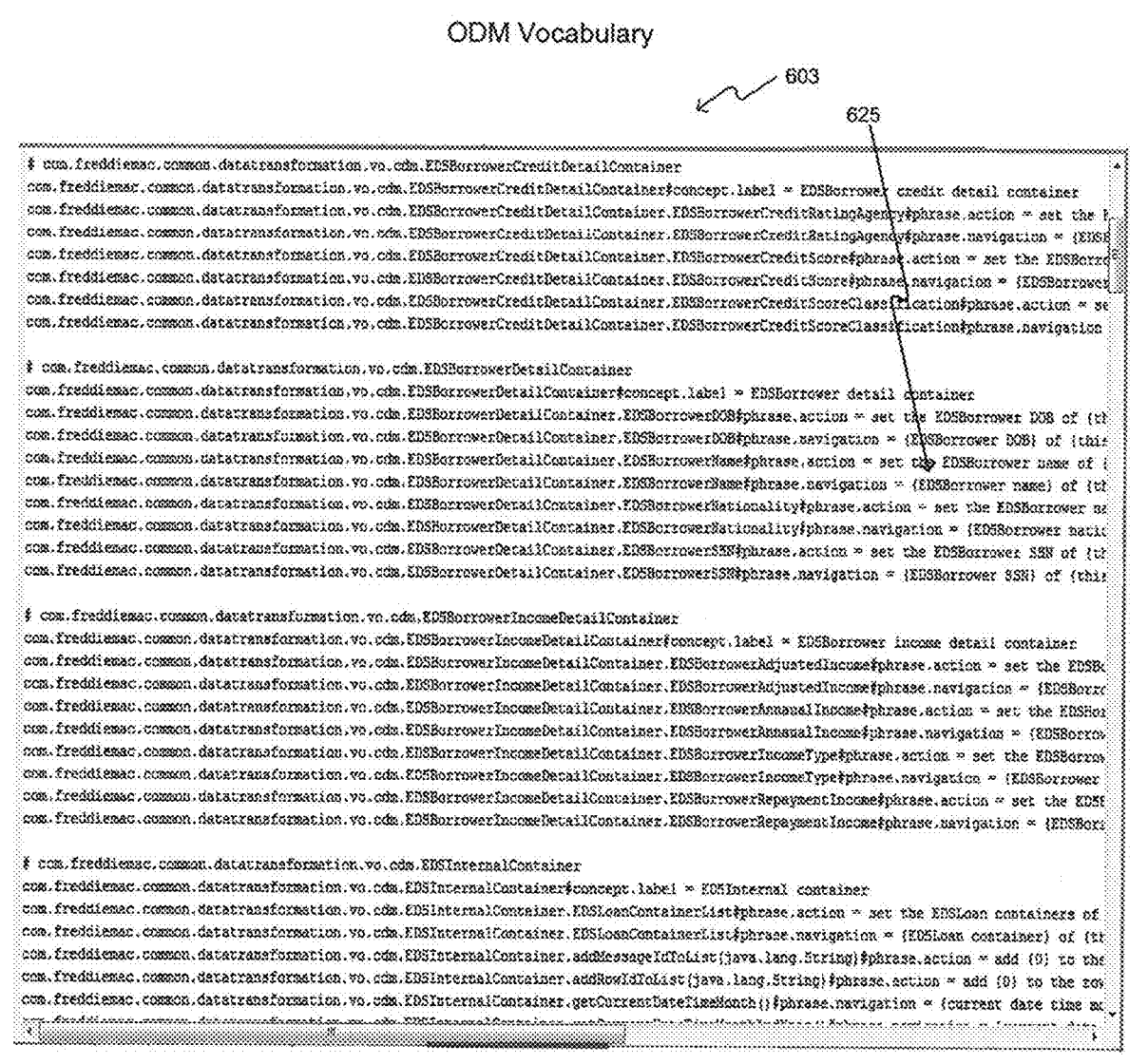

FIGS. 6A-6D show detailed examples of glossary-related inputs and the corresponding outputs of the adapter 130. FIG. 6A shows an example of a BDMS glossary 600 (e.g., such as glossary 122 of FIG. 1A or BDMS glossary 505 of FIG. 5) that is an input to the adaptor 130; FIG. 6B shows an example of a reference glossary 601 that is initially an output of Adaptor and is later used as an input by Adaptor for translating a Collective Rule Family(s) 120 or other business rule into an ODM decision table 150; and FIGS. 6C and 6D show examples of an ODM BOM file 602 and an ODM Vocabulary file 603 created and output by the adaptor 130 and corresponding to the input reference glossary 601.

In particular, FIG. 6A shows an example of a portion of a BDMS Glossary data structure 600, consistent with embodiments of the invention. In various embodiments, the adaptor 130 of FIG. 1A may receive or retrieve a glossary 122 from the BDMS 105, and the glossary 122 may contain a data structure 600 that defines glossary elements as shown in FIG. 6A. As shown in this example, the BDMS Glossary data structure 600 may include a "borrower name" data element 605, including its defining characteristics and attributes, in an XML-type format used by the BDMS 105.

FIG. 6B is an example of a portion of a Reference Glossary data structure 601 used by the communication adaptor 130 (of FIG. 1A) to produce ODM-usable artifacts, consistent with embodiments of the invention. As shown in this example, the Reference Glossary data structure 601 may include a "borrower name" data element 610 representing the variable used by the BDMS 105 and an "EDSBorrowerName" data element 615 representing the equivalent variable used by the ODM 140. Also as shown, the data elements include their defining characteristics and attributes in an XML-type format. As noted above, the adaptor 130 may use the existing Reference Glossary data structure 601 to detect new data elements in a glossary 122 supplied by the BDMS 105, and to verify or validate data elements in other artifacts of BDMS 105 to check whether any invalid changes occurred.

FIG. 6C is an example of a portion of an ODM BOM data structure 602 produced by the communication adaptor 130, consistent with embodiments of the invention. As shown in FIG. 1A, the adaptor 130 may convert the glossary 122 from the BDMS 105 into a Reference Glossary 601 and using this Reference Glossary 601, the adaptor converts the glossary 122 into a BOM 152 (such as, e.g., the ODM BOM data structure 602), which can be executed by the ODM 140. In converting into the BOM 152, the adaptor 130 may create a new BOM or modify an existing BOM that it previously stored.

Referring again to FIG. 6C, this example of a BOM shows that the adaptor 130 has included an "EDSBorrowerName" data element 620, which is the ODM 140's equivalent to the "borrower name" data element 605 created using the Reference Glossary data structure 601.

FIG. 6D is an example of an ODM Vocabulary data structure 603 produced by a communication adaptor 130, consistent with embodiments of the invention. As shown in FIG. 5, the adaptor 130 may convert the Reference glossary 601 into a set of ODM artifacts that includes a Vocabulary file 540 (such as, e.g., the ODM Vocabulary data structure 603), which can be executed by the ODM 140.

Referring again to FIG. 6D, this example of a Vocabulary file 540 shows that the adaptor 130 has included an "EDSBorrowerName" data element 625, which is the ODM 140's equivalent to the "borrower name" data element 605 using Reference Glossary data structure 601.

Figure 7A:
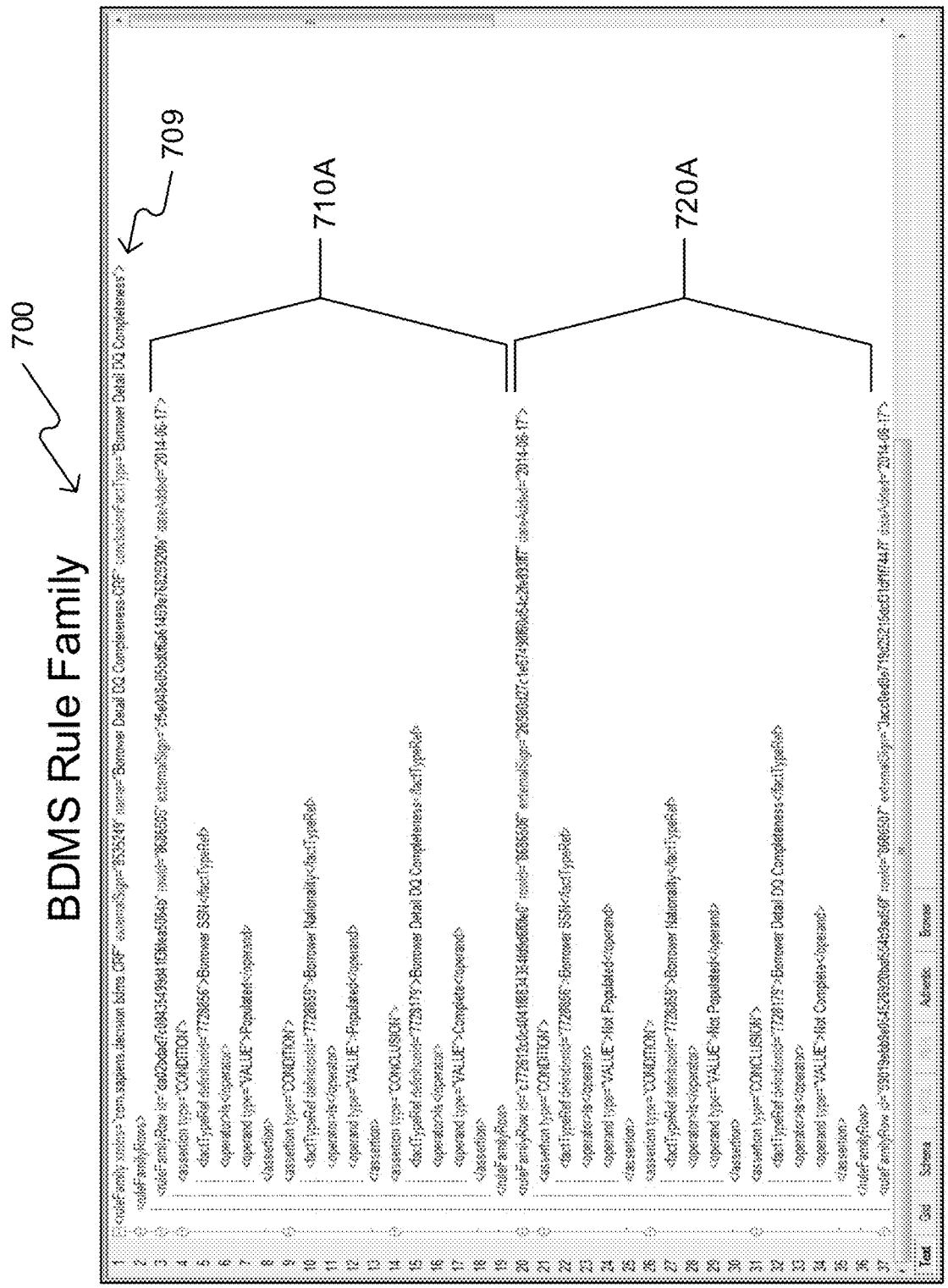
FIG. 7A is an example of a BDMS Rule Family data structure, consistent with embodiments of the invention.
Figure 7B:
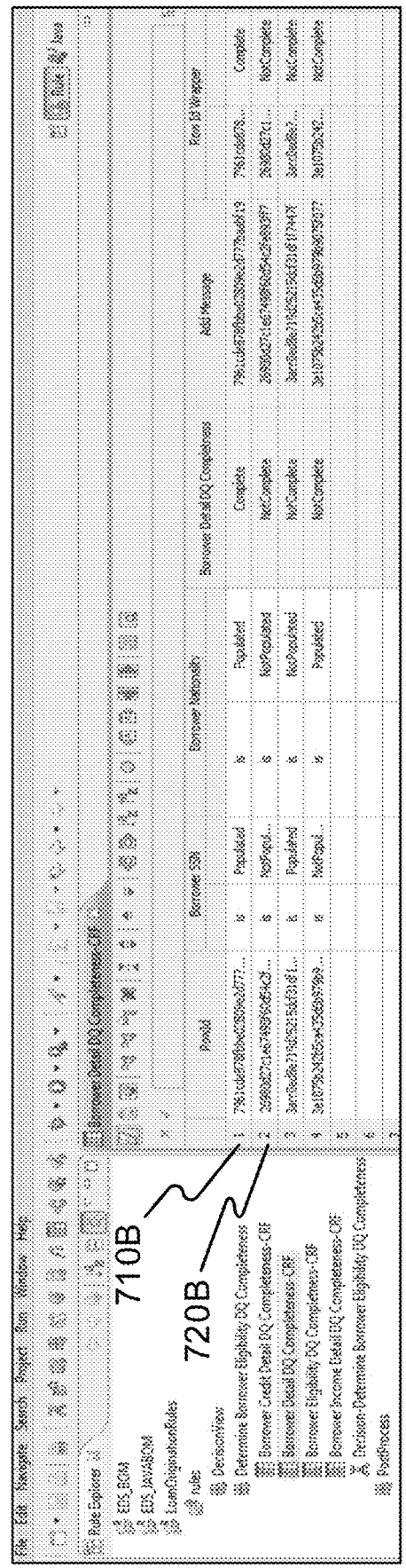
FIG. 7B is an example of an ODM Decision Table data structure produced by an adaptor for communication between a BDMS and an ODM, consistent with embodiments of the invention.
Figure 7C:
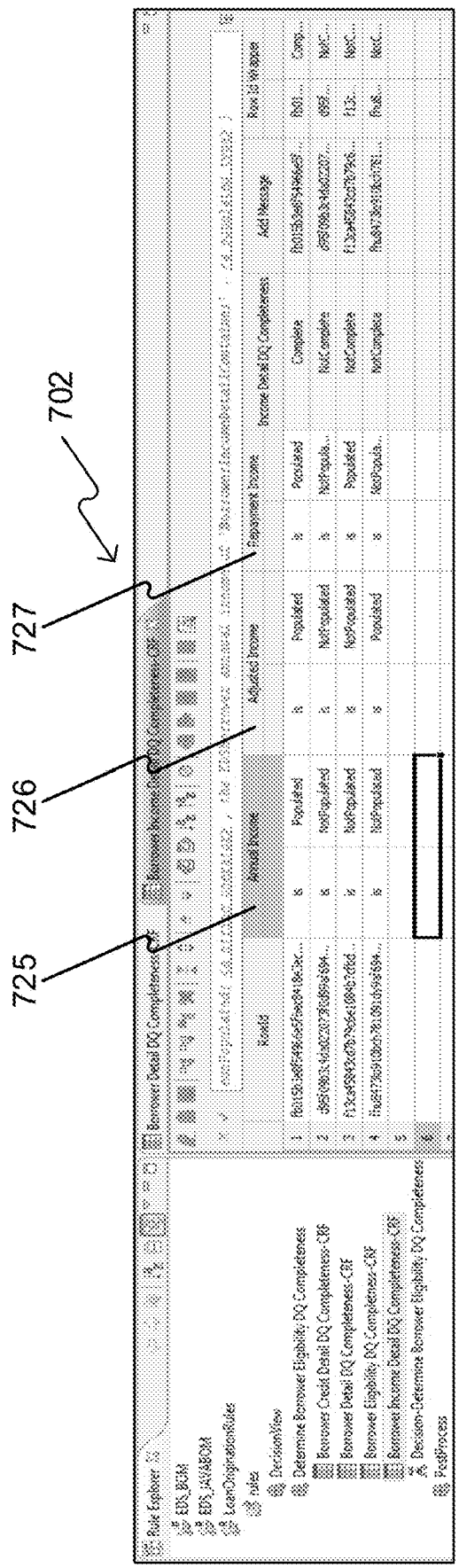
FIG. 7C is another example of an ODM Decision Table data structure produced by an adaptor for communication between a BDMS and an ODM, consistent with embodiments of the invention.
Figure 7D:
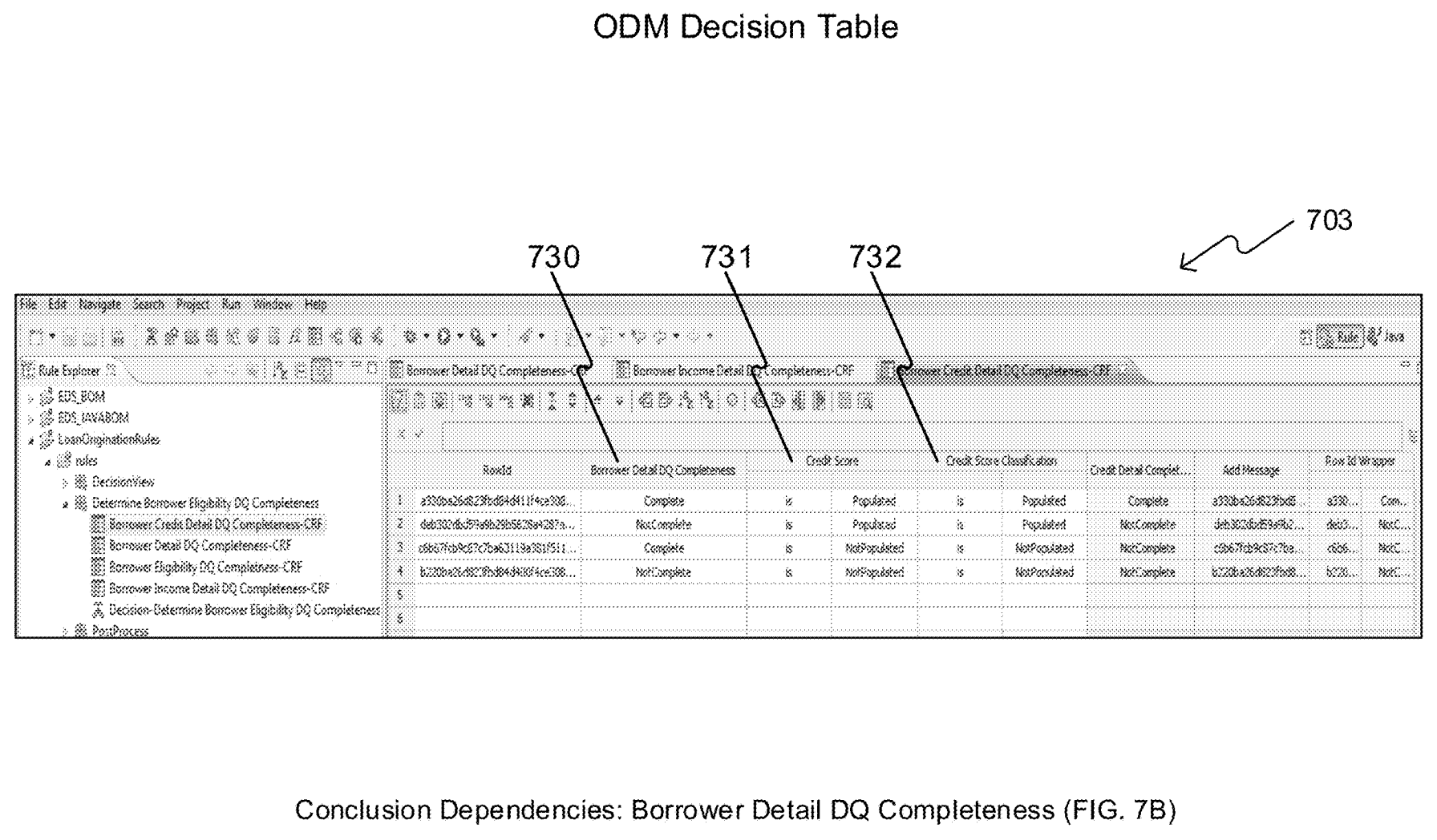
Figure 7F:
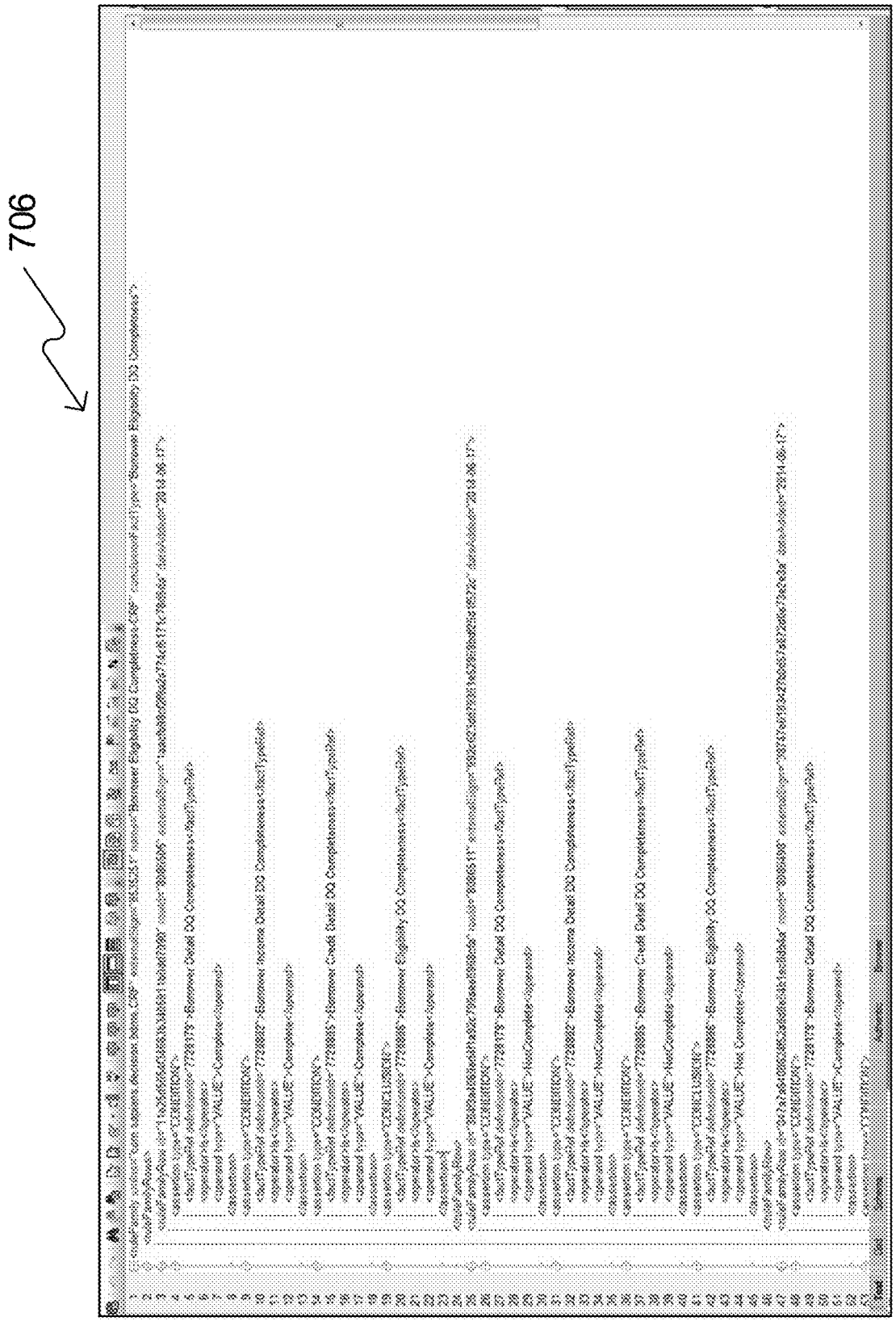
FIG. 7F is an example of BAL business rules that may be received by or input to an adaptor and used by the adaptor to produce output for an ODM, consistent with embodiments of the invention.
Figure 7G:
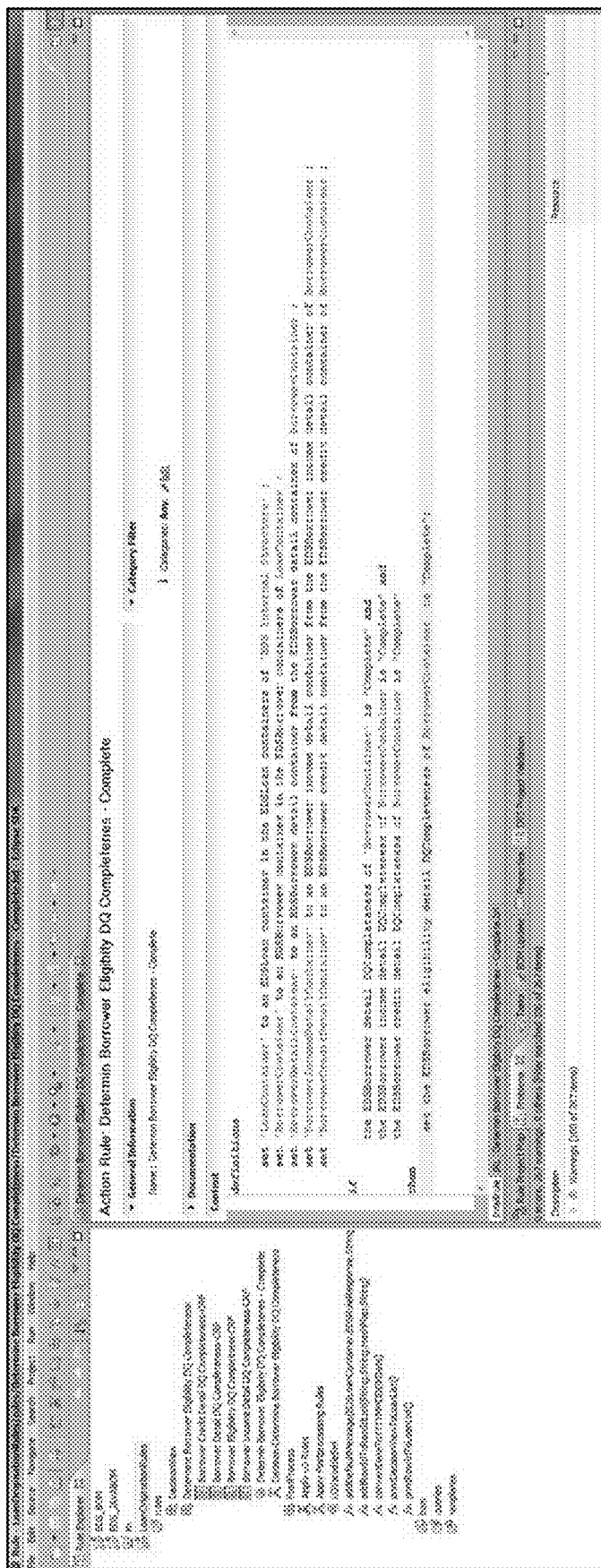
FIG. 7G is an example of BAL rules produced by an adaptor for communication between a BDMS and an ODM, consistent with embodiments of the invention.
Figure 7H:
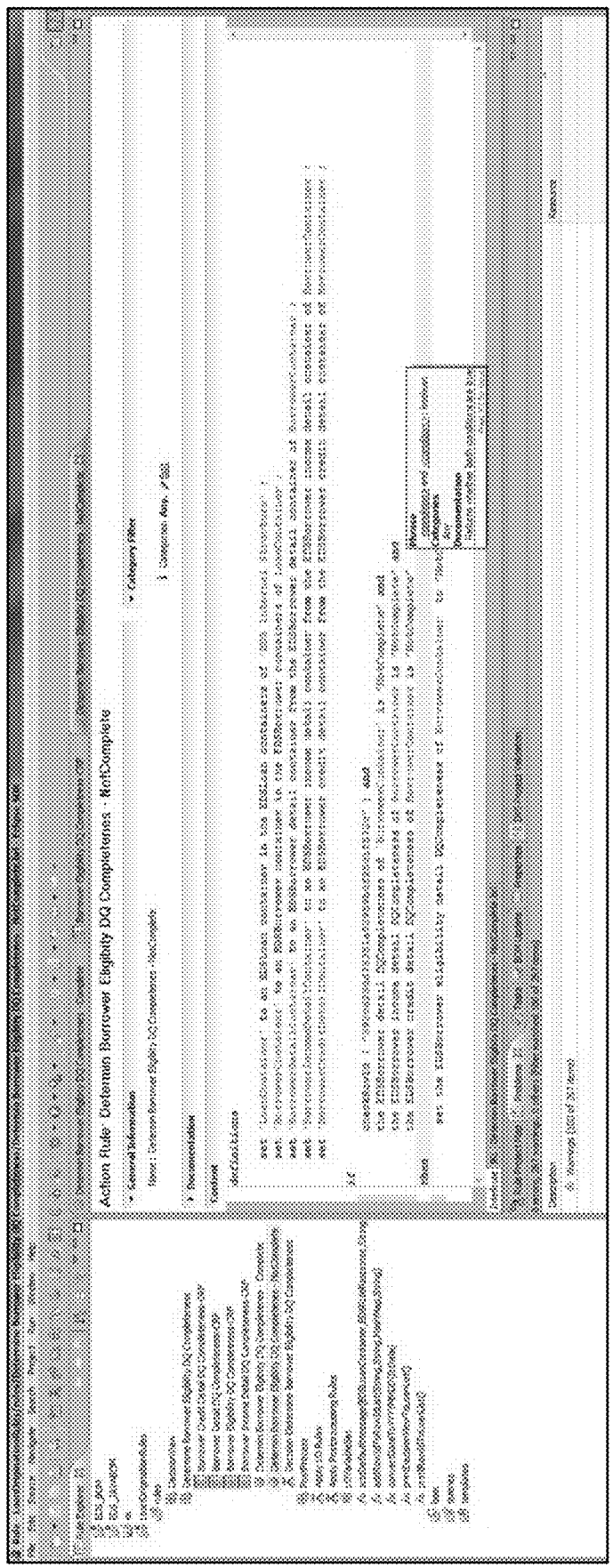
FIG. 7H is another example of BAL rules produced by an adaptor for communication between a BDMS and an ODM, consistent with embodiments of the invention.

FIGS. 7A-7E show detailed examples of rule-family-related inputs and the corresponding outputs of the adapter 130. FIG. 7A shows an example of a BDMS rule family 700 (e.g., such as rule family 120 of FIG. 1A) that is an input to the adaptor 130; FIG. 7B shows an example of an ODM decision table 701 that is created and communicated to the ODM 140 by the adaptor 130 and that corresponds to the input BDMS rule family 700; FIGS. 7C-7E show additional examples of ODM decision tables 702-704 that are created and output by the adaptor 130 and that correspond to the input BDMS rule family 700.

In particular, FIG. 7A shows an example of a portion of a BDMS Rule Family data structure 700, consistent with embodiments of the invention. In various embodiments, the adaptor 130 (of FIG. 1A) may receive or retrieve a rule family 120 from the BDMS 105, and the rule family 120 may contain a BDMS Rule Family data structure 700 that defines rules (e.g., business rules or business logic) as shown in FIG. 7A. In this example, the BDMS Rule Family data structure 700 includes a "Borrower Detail DQ Completeness-CRF" data structure 709 in an XML-type format used by the BDMS 105, which is a collective rule family that includes several rules that determine whether or not all of the information required to describe a loan borrower is present or complete. The "Borrower Detail DQ Completeness-CRF" data structure 709 extends beyond the screen shown in FIG. 7A, but as is visible in the portion shown in FIG. 7A, the BDMS Rule Family data structure 700 includes a first rule 710A and a second rule 720A, (among others (not shown)), which determine whether information indicating the borrower's social security number and information indicating the borrower's nationality are populated or present.

FIG. 7B is a representation of an ODM Decision Table data structure 701 produced by a communication adaptor 130 (e.g. from the "Borrower Detail DQ Completeness-CRF" data structure 709), consistent with embodiments of the invention. As shown in FIG. 1A, the adaptor 130 may convert the BDMS Rule Family data structure 700 (e.g., the collective rule family 120 from the BDMS 105) into an ODM Decision Table data structure 701, (such as, e.g., the decision table(s) 150), which can be sent to and executed by the ODM 140.

Referring to FIG. 7B, this example of an ODM decision table 701 shows a first rule 710B for Borrower Detail DQ Completeness, which the adaptor 130 created as the ODM 140's equivalent to the first rule 710A from the BDMS Rule Family data structure 700. The ODM decision table 701 also shows a second rule for Borrower Detail DQ Completeness 720B, which the adaptor 130 created as the ODM 140's equivalent to the second rule 720A from the BDMS Rule Family data structure 700. The ODM decision table 701 also shows two additional rules for determining Borrower Detail DQ Completeness, although the two BDMS equivalents are not shown in the portion of a rule family shown in FIG. 7A.

FIG. 7C is another example of a representation of an ODM Decision Table data structure 702 produced by a communication adaptor 130, consistent with embodiments of the invention. FIG. 7C shows four rules from the "Borrower Income DQ Completeness" collective rule family or rule set—one in each row. In this example, each of the four rules in the set examines three variables or data elements: Annual Income 725, Adjusted Income 726, and Repayment Income 727. Thus, none of the four rules shown depend upon a conclusion or determination made by another rule.

FIG. 7D is another example of a representation of an ODM Decision Table data structure 703 produced by a communication adaptor 130, consistent with embodiments of the invention. FIG. 7D shows four rules from the "Borrower Income DQ Completeness" collective rule family— one in each row. In this example, each of the four rules examines two variables or data elements and one conclusion from another rule family. The variables are Credit Score 731 and Credit Score Classification 732, and the conclusion is Borrower Detail DQ Completeness 730, which is the output or determination or conclusion produced by execution of the Borrower Detail DQ Completeness-CRF rule set shown in FIG. 7B. The adaptor 130 recognizes this dependency and configures the Borrower Detail DQ Completeness-CRF rule set shown in FIG. 7B to be executed by the ODM 140 before the "Borrower Income DQ Completeness-CRF" rule set shown in FIG. 7D.

In various embodiments, the adaptor 130 may recognize the dependency or dependencies between two or more rule families by matching a conclusion fact type in a rule family to a condition fact type of the same name in another rule family. The adaptor 130 can determine that if a rule family A uses a rule family B conclusion in its conditions, then it means B has to precede A in order of execution of the rule flows. Based on this, the adaptor 130 may then configure and communicate the proper execution order to the ODM 140.

FIG. 7E is yet another example of a representation of an ODM Decision Table data structure 704 produced by a communication adaptor 130, consistent with embodiments of the invention. FIG. 7E shows four rules from the "Borrower Eligibility DQ Completeness-CRF" collective rule family or rule set—one in each row. In this example, each of the four rules examines three conclusions from other rule sets. The conclusions are: Borrower Detail DQ Completeness 730, which is the output or determination or conclusion produced by execution of the Borrower Detail DQ Completeness-CRF rule set shown in FIG. 7B; Borrower Income Detail DQ Completeness 740, which is the output or determination or conclusion produced by execution of the Borrower Income Detail DQ Completeness—CRF rule set shown in FIG. 7C; and Borrower Credit Detail DQ Completeness 750, which is the output or determination or conclusion produced by execution of the Borrower Credit Detail DQ Completeness—CRF rule set shown in FIG. 7D.

The adaptor 130 recognizes these dependencies and configures the Borrower Eligibility DQ Completeness-CRF rule set shown in FIG. 7E to be executed by the ODM 140 after the Borrower Detail DQ Completeness-CRF rule set 701, the Borrower Income Detail DQ Completeness rule set 702, and the Borrower Credit Detail DQ Completeness rule set 703.

Figure 8A:
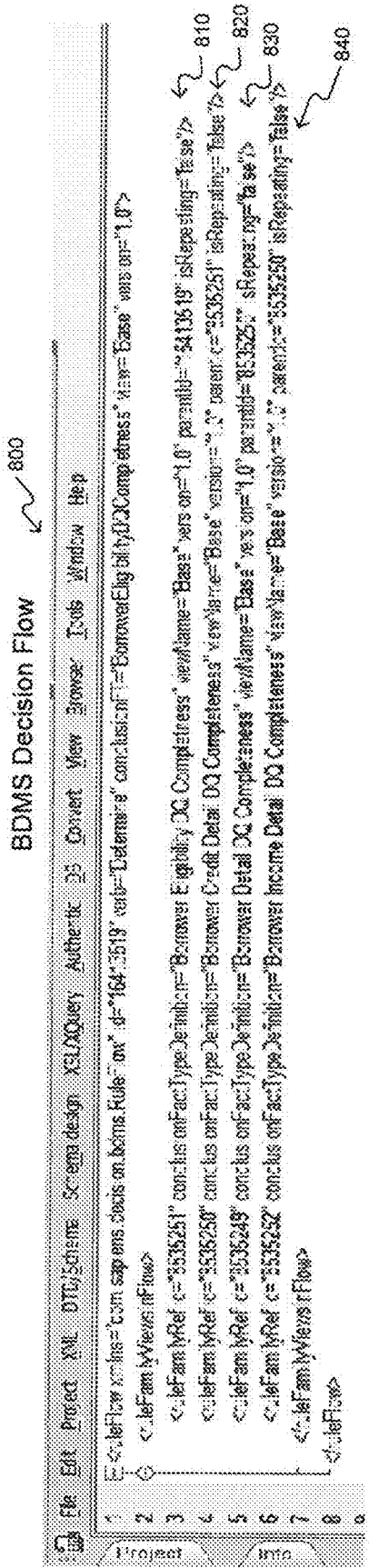
FIG. 8A is an example of a BDMS Decision Flow data structure, consistent with embodiments of the invention.
Figure 8B:
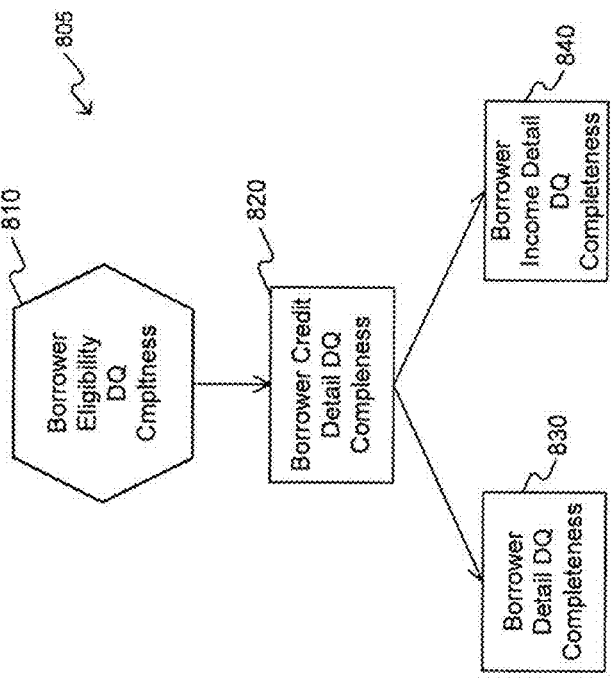
FIG. 8B is another example of a BDMS Decision Flow data structure, consistent with embodiments of the invention.
Figure 8C:
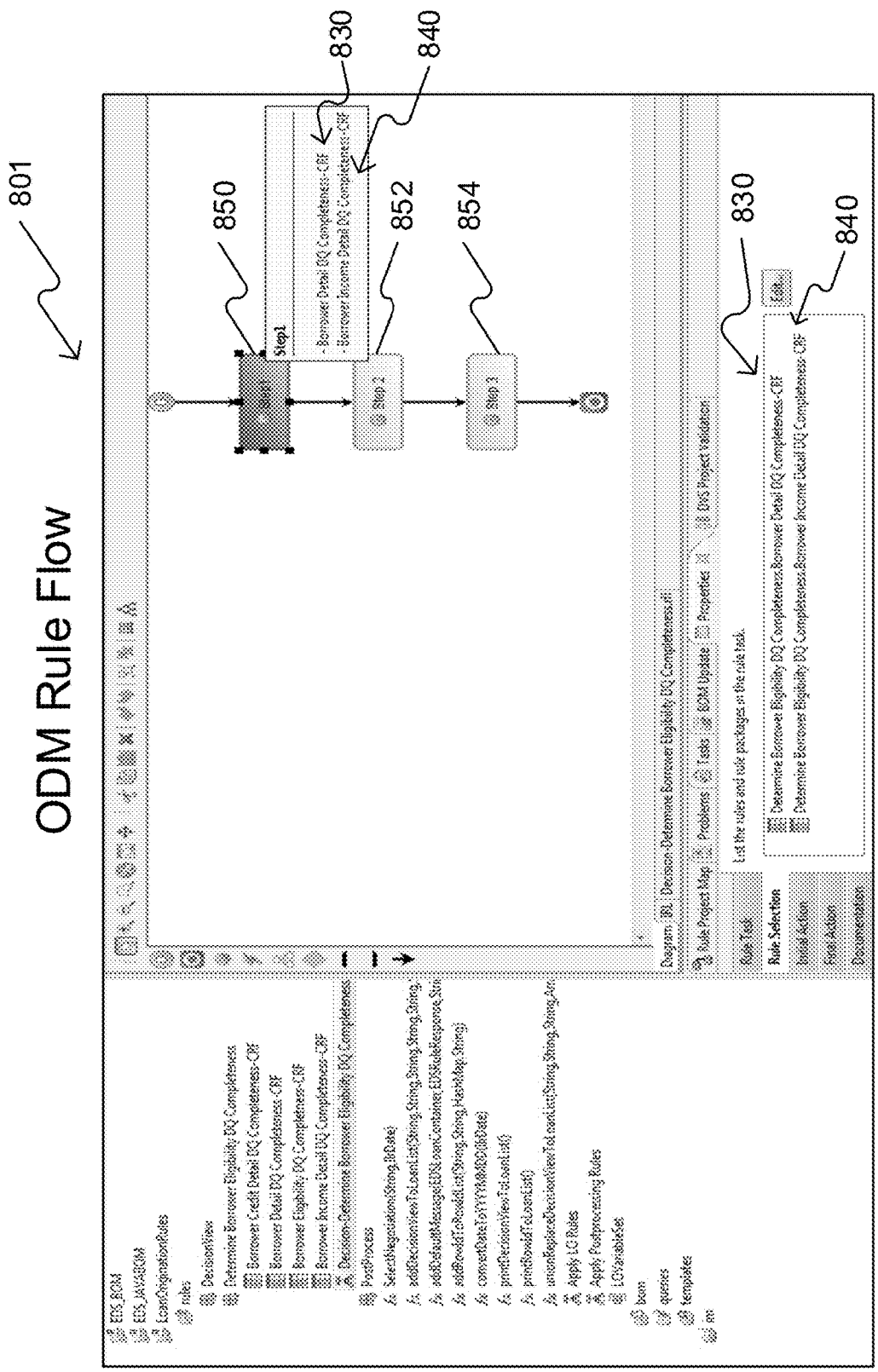
FIG. 8C is a representation of an ODM Rule Flow data structure produced by an adaptor for communication between a BDMS and an ODM, consistent with embodiments of the invention.
Figure 8D:
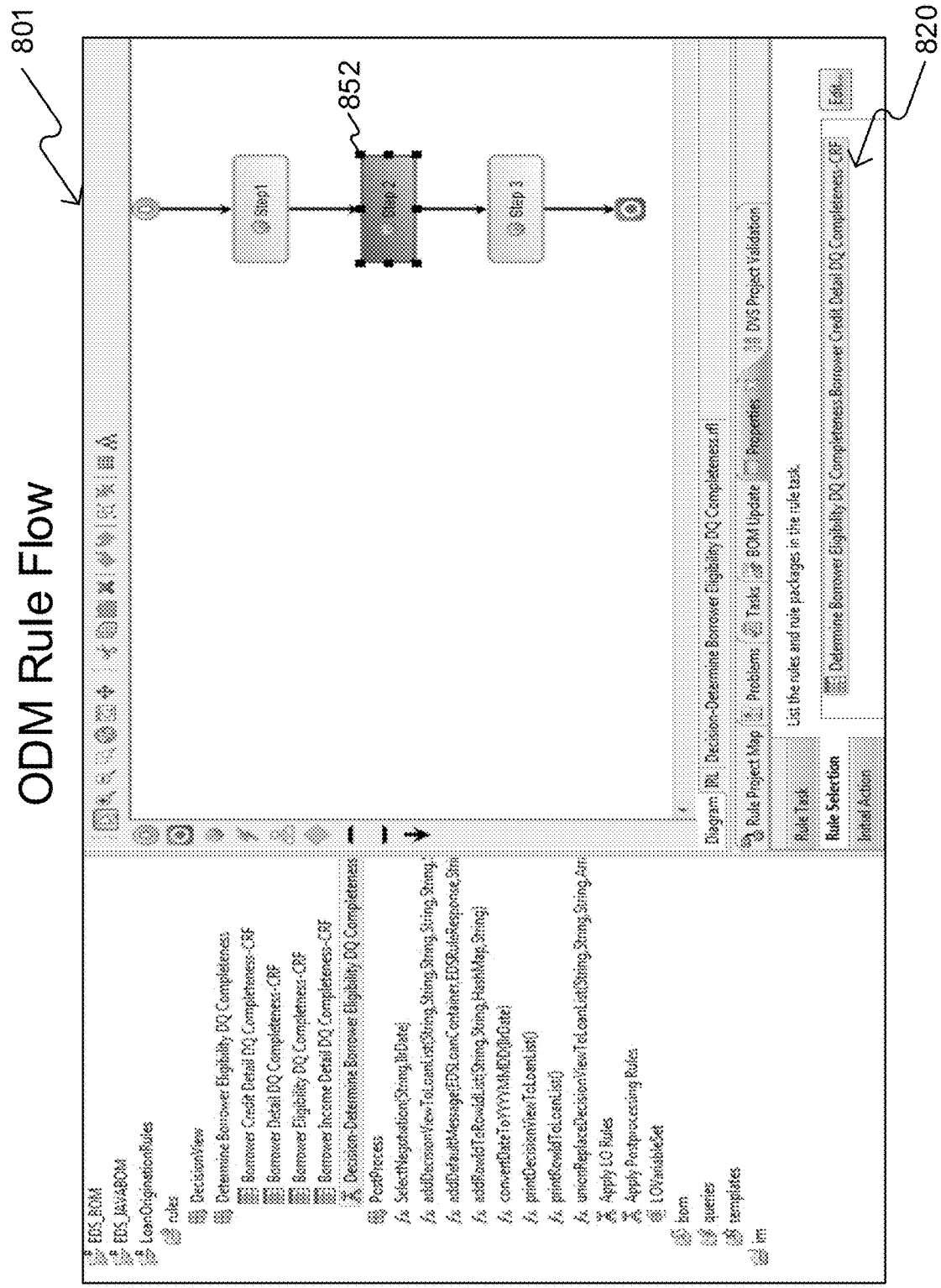
FIG. 8D is a representation of another ODM Rule Flow data structure produced by an adaptor for communication between a BDMS and an ODM, consistent with embodiments of the invention.
Figure 8E:
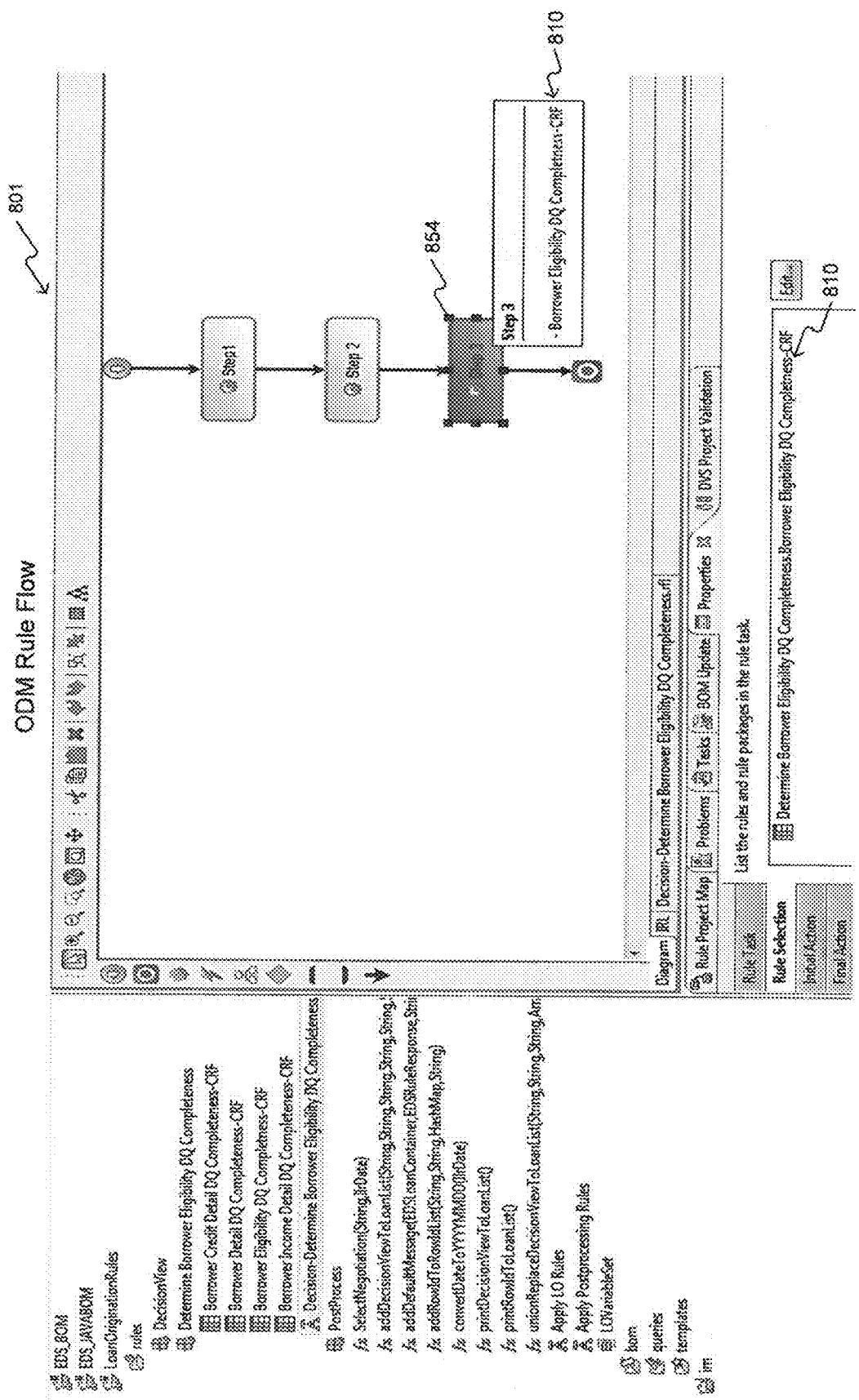
FIG. 8E is a representation of another ODM Rule Flow data structure produced by an adaptor for communication between a BDMS and an ODM, consistent with embodiments of the invention.

FIGS. 8A-8E show detailed examples of decision-flow-related inputs and the corresponding outputs of the adapter 130. FIGS. 8A and 8B show examples of a BDMS decision flow 800 (e.g., such as decision flow 126 of FIG. 1A) that is an input to the adaptor 130; FIGS. 8C-8E shows an example of an ODM rule flow 801 that is created and output by the adaptor 130 and that corresponds to the input BDMS decision flow 800.

In particular, FIG. 8A is an example of a representation of a BDMS Decision Flow data structure 800, consistent with embodiments of the invention, and FIG. 8B is a block diagram 805 representing the same BDMS Decision Flow. In various embodiments, the adaptor 130 (of FIG. 1A) may receive or retrieve a decision flow 126 from the BDMS 105, and the decision flow 126 may contain a data structure 800 that defines the flow or execution order of rules (e.g., business rules or business logic) as shown in FIG. 8A. In this example, the BDMS Decision Flow data structure 800 defines the execution flow of a "Borrower Eligibility Detail DQ Completeness" rule family or set 810, a "Borrower Credit Detail DQ Completeness" rule family 820, a "Borrower Detail DQ Completeness" rule family 830, and a "Borrower Income Detail DQ Completeness" rule family 840; all in an XML-type format used by the BDMS 105. As shown in FIG. 8A, the BDMS Decision Flow data structure 800 specifies the execution flow in a top down manner, with the parent 810 at the top of the XML data structure and the child 820 and child's children 830 and 840 below.

FIG. 8B is an example of a block-diagram representation 805 of the BDMS Decision Flow data structure 800, consistent with embodiments of the invention. FIG. 8B illustrates perhaps more clearly the top-down organization of a BDMS decision flow, in a manner similar to that shown in FIG. 3. FIG. 8B illustrates that the "Borrower Eligibility Detail DQ Completeness" rule family 810 depends on its child, the "Borrower Credit Detail DQ Completeness" rule family 820 to be completed before it can be executed. Similarly, FIG. 8B FIG. 8B illustrates that the "Borrower Credit Detail DQ Completeness" rule family 820 depends on its two children, the "Borrower Detail DQ Completeness" rule family 830 and the "Borrower Income Detail DQ Completeness" rule family 840 to be completed before it can be executed. As noted above, this top-down organization is not compatible with the ODM 140's operation, and the adaptor 130 creates equivalent non-top-down ODM rule flow(s) 156 from the BDMS Decision Flow data structure 800, which rule flow(s) 156 are usable by the ODM 140.

FIG. 8C is a representation of an ODM Rule Flow data structure 801 produced by a communication adaptor 130, consistent with embodiments of the invention. As shown in FIG. 1A, the adaptor 130 may convert the BDMS Decision Flow data structure 800 (e.g., the decision flow 126 from the BDMS 105) into an ODM Rule Flow data structure 801, (such as, e.g., the rule flow(s) 156), which is communicated to and can be executed by the ODM 140.

Referring to FIG. 8C, this example of an ODM rule flow 801 shows three steps: Step 1 850, Step 2 852, and Step 3 854. Steps 850-854 may be referred to as rule tasks. In various embodiments, a rule task contains one more rule artifacts and defines the execution order of rule artifacts and the algorithm for the ODM 140 to use while executing the rules. The adaptor 130 creates the Step 1 850, Step 2 852, and Step 3 854 rule tasks, based on decision flow 126 and rule family 120 dependencies, adds rules to respective rule tasks, and also configures the rule task properties, such as the algorithm, the ordering, and the exit criteria of the rule task.

As shown in the figure, Step 1 850 specifies the execution of two rule families by the ODM 140: the "Borrower Detail DQ Completeness" rule family 830, and the "Borrower Income Detail DQ Completeness" rule family 840. In creating this rule flow 801, the adaptor 130 has taken the top-down BDMS Decision Flow data structure 800 of FIG. 8A and converted it into a bottom-up execution sequence as required by the ODM 140 to correctly implement the rules in the same manner as the BDMS 105. In various embodiments, the ODM 140 may build a data structure in a tree format from the BDMS decision flow 126 and then inverse the tree to create the corresponding rule flow 156 for the ODM 140. The adaptor 130 creates the tree on the ODM 140 side based on the depth of the nodes in the tree. For example, the decision flow "Top→Step1→Step2" can be represented as a three level tree. Step1 may contain more multiple rule families of the same depth based on the dependency relationship established among rule families by the adaptor 130. Thus, in the example shown, the adaptor 130 places rule families 830 and 840, which are specified last in the BDMS Decision Flow 800, in Step 1 850 of the ODM rule flow 801.

FIGS. 8D and 8E are further views of the ODM Rule Flow data structure 801 produced by a communication adaptor, consistent with embodiments of the invention. In FIG. 8D, Step 2 852 specifies the execution of the "Borrower Credit Detail DQ Completeness" rule family 820 by the ODM 140 after the execution of the rule families in Step 1 850. Thus, if any of the rules in the of the "Borrower Credit Detail DQ Completeness" rule family 820 are dependent on a conclusion(s) from one or more of the rule families in Step 1 850, that conclusion(s) will be available when the "Borrower Credit Detail DQ Completeness" rule family 820 is executed by the ODM 140. See FIG. 7D for a further explanation of rule family dependencies.

In FIG. 8E, Step 3 854 specifies the execution of the "Borrower Eligibility Detail DQ Completeness" rule family 810 by the ODM 140 after the execution of the rule families in Step 2 852 and Step 1 852. Thus, if any of the rules of the "Borrower Eligibility Detail DQ Completeness" rule family 810 are dependent on a conclusion(s) from one or more of the rule families in Step 1 850 or Step 2 852, that conclusion(s) will be available. See FIG. 7E for a related explanation of rule family dependencies.

Figure 9:
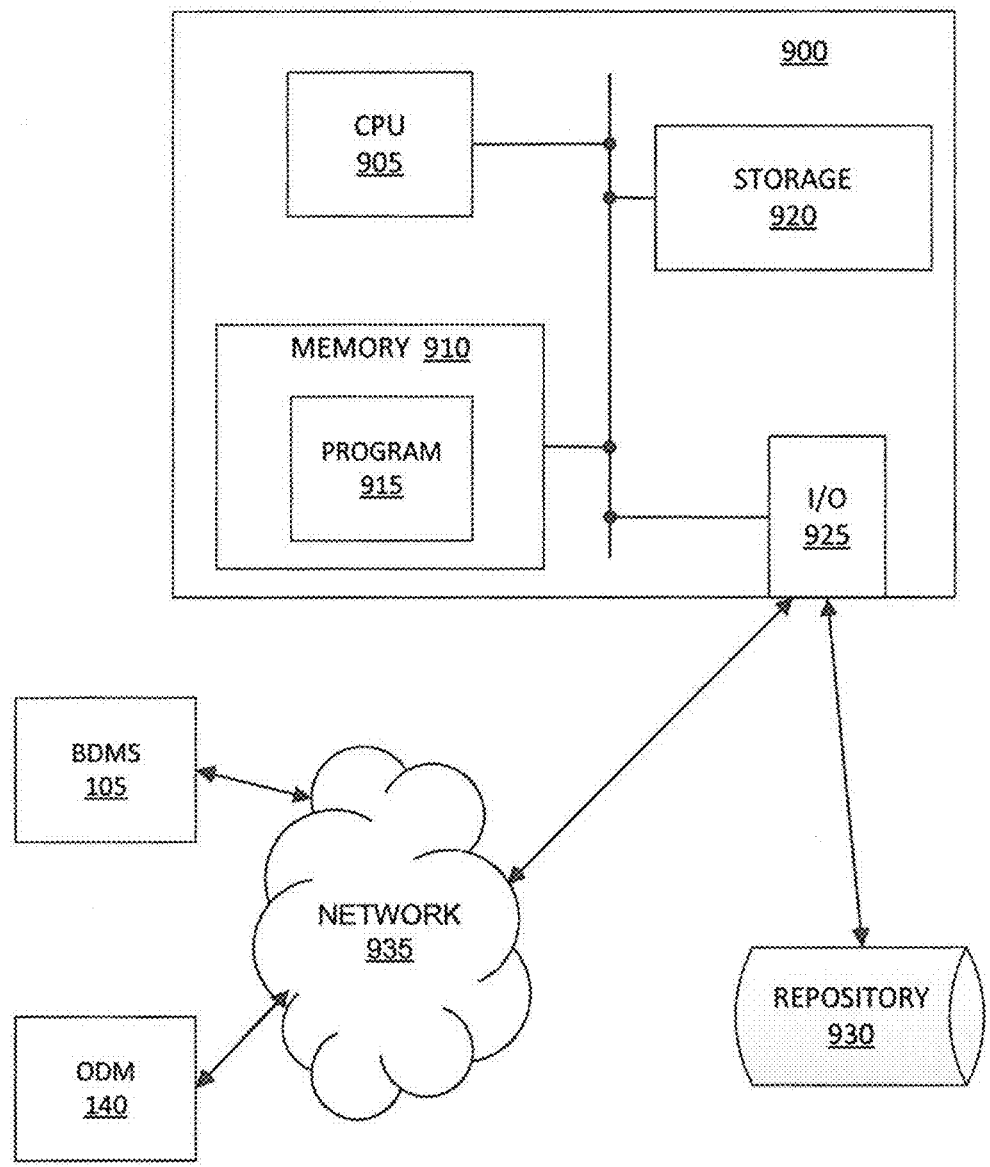
FIG. 9 is a block diagram of an example of a computing system that may be used to implement various embodiments consistent with the invention.

FIG. 9 is a block diagram of an example of a computing system 900 that may be used to implement various embodiments consistent with the invention. Other components and/or arrangements may also be used. In some embodiments, computing system 900 may be used to implement, either partially or fully, the adaptor 130 of FIGS. 1A and 5 and/or the process of FIG. 1B.

Computing system 900 includes a number of components, such as a central processing unit (CPU) 905, a memory 910, an input/output (I/O) device(s) 925, and a nonvolatile storage device 920. System 900 can be implemented in various ways. For example, an implementation as an integrated platform (such as a server, workstation, personal computer, laptop, smart phone, etc.) may comprise CPU 905, memory 910, nonvolatile storage 920, and I/O devices 925. In such a configuration, components 905, 910, 920, and 925 may connect and communicate through a local data bus and may access a repository 930 (implemented, for example, as a separate database system) via an external I/O connection. I/O component(s) 925 may connect to external devices through a direct communication link (e.g., a hardwired or local Wi-Fi connection), through a network, such as a local area network (LAN) or a wide area network (WAN), and/or through other suitable connections. System 900 may be standalone or it may be a subsystem of a larger system.

CPU 905 may be one or more known processors or processing devices, such as a microprocessor from the Core™ 2 family manufactured by the Intel™ Corporation of Santa Clara, Calif. or a microprocessor from the Athlon™ family manufactured by the AMD™ Corporation of Sunnyvale, Calif. Memory 910 may be one or more fast storage devices configured to store instructions and information used by CPU 905 to perform certain functions, methods, and processes related to embodiments of the present invention. Storage 920 may be a volatile or non-volatile, magnetic, semiconductor, tape, optical, or other type of storage device or computer-readable medium, including devices such as CDs and DVDs, meant for long-term storage.

In the illustrated embodiment, memory 910 contains one or more programs or subprograms 915 loaded from storage 920 or from a remote system (not shown) that, when executed by CPU 905, perform various operations, procedures, processes, or methods consistent with the present invention, which makes system 900 into a specialized communication adaptor device that provides a new communication channel between the BDMS 105 and the ODM 140. Alternatively, CPU 905 may execute one or more programs located remotely from system 900. For example, system 900 may access one or more remote programs via network 935 that, when executed, perform functions and processes related to embodiments of the present invention.

In one embodiment, memory 910 may include a program(s) 915 for providing a communication channel between the BDMS 105 and the ODM 140, such as a program 915 that implements the creation and transmitting or deploying of ODM business logic artifacts that are equivalent to the BDMS-produced artifacts. In some embodiments, memory 910 may also include other programs or applications that implement other methods and processes that provide ancillary functionality to the invention. For example, memory 910 may include programs that access, receive, transmit, communicate, gather, organize, store, and/or generate invention-related data, such as loan data, reference glossary data, application data, etc.

Memory 910 may be also be configured with other programs (not shown) unrelated to the invention and/or an operating system (not shown) that performs several functions well known in the art when executed by CPU 905. By way of example, the operating system may be Microsoft Windows™, Unix™, Linux™, an Apple Computers™ operating system, Personal Digital Assistant operating system such as Microsoft CE™, or other operating system. The choice of operating system, and even to the use of an operating system, is not critical to the invention.

I/O device(s) 925 may comprise one or more input/output devices that allow data to be received and/or transmitted by system 900. For example, I/O device 925 may include one or more input devices, such as a keyboard, touch screen, mouse, and the like, that enable data to be input from a user. Further, I/O device 525 may include one or more output devices, such as a display screen, CRT monitor, LCD monitor, plasma display, printer, speaker devices, and the like, that enable data to be output or presented to a user. I/O device 925 may also include one or more digital and/or analog communication input/output devices that allow computing system 900 to communicate, for example, digitally, with other machines and devices, such as the BDMS 105 and the ODM 140. Other configurations and/or numbers of input and/or output devices may be incorporated in I/O device 925.

In the embodiment shown, system 900 is connected to a network 935 (such as the Internet, a private network, a virtual private network, or other network), which may in turn be connected to various systems and computing machines, such as the BDMS 105, the ODM 140, or other servers, personal computers, laptop computers, client devices, etc. In general, system 900 may input data from external machines and devices and output data to external machines and devices via network 935. FIG. 9 shows examples of a first communications link from the system 900 through the network 935 to the BDMS 105, and a second communications link from the system 900 through the network 935 to the ODM 140.

In the exemplary embodiment shown in FIG. 9, repository 930 is a standalone repository external to system 900. In other embodiments, repository 930 may be hosted by system 900. In various embodiments, repository 930 may manage and store data used to implement systems and methods consistent with the invention. For example, repository 930 may manage and store data structures that contain loan data and artifacts used by the BDMS 105 and the ODM 140, etc.

Repository 930 may comprise one or more databases that store information and are accessed and/or managed through system 900. By way of example, repository 930 may be an Oracle™ database, a Sybase™ database, or other relational database. Systems and methods consistent with the invention, however, are not limited to separate data structures or databases, or even to the use of a database or data structure, and repository 930 could be implemented in other ways.

One of ordinary skill will recognize that examples of systems, processes, and data structures shown in FIGS. 1-10 are presented for conciseness and clarity of explanation, and that features, components, operations, etc. may be added to, deleted from, reordered, or modified within these examples without departing from the principles of the invention. Other features, components, operations and implementation details may be used.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An adaptor device for providing a communication channel between two disparate decision management systems, the device comprising:
   a first communications link to a first decision management system;
   a second communications link to a second decision management system;
   a memory containing instructions; and
   a processor, operably coupled to the memory, that executes the instructions to perform operations comprising:
     receiving, from the first decision management system, a first plurality of artifacts that defines a first set of logic for a decision and that is executable by the first decision management system, wherein the first plurality of artifacts includes a top-down decision flow artifact;
     converting the first plurality of artifacts from the first decision management system into a second plurality of artifacts that defines a second set of logic for the decision, that is equivalent to the first set of business logic, and that is executable by the second decision management system,
       wherein the converting comprises creating a bottom-up rule flow artifact that is equivalent to the top-down decision flow artifact; and
     communicating the second plurality of artifacts to the second decision management system, which executes the second plurality of artifacts.

2. The adaptor device of claim 1, wherein the first plurality of artifacts includes a rule family artifact; and
   wherein converting the first plurality of artifacts further comprises:
     converting the rule family artifact into a decision table artifact that is executable by the second decision management system.

3. The adaptor device of claim 1, wherein the first plurality of artifacts includes a glossary artifact; and
   wherein converting the first plurality of artifacts further comprises:
     converting the glossary artifact into a business object model artifact that is executable by the second decision management system.

4. The adaptor device of claim 3, wherein converting the first plurality of artifacts further comprises:
   converting the glossary artifact into a vocabulary artifact that is used by the second decision management system.

5. The adaptor device of claim 3, wherein the operations further comprise:
accessing a reference glossary;
identifying a data element in the glossary artifact that is not in the reference glossary; and
creating a new data element in the business object model artifact that is equivalent to the data element.

6. The adaptor device of claim 1, wherein the first decision management system is a business decision management system (BDMS).

7. The adaptor device of claim 6, wherein the business decision management system tracks, verifies and ensures that each decision is based on up-to-date rules and policies.

8. The adaptor device of claim 1, wherein the second decision management system is an operational decision management (ODM) system.

9. The adaptor device of claim 8, wherein the operational decision management (ODM) system provides a computerized platform for an organization to capture, automate and govern frequent, repeatable business decisions.

10. The adaptor device of claim 1, wherein the operations further comprise:
detecting an error in the first plurality of artifacts from the first decision management system for errors; and
reporting the error to a user.

11. The adaptor device of claim 1, wherein the operations further comprise:
storing the second plurality of artifacts in a repository;
retrieving the second plurality of artifacts from the repository; and
modifying the second plurality of artifacts to correspond to another plurality of artifacts received from the first decision management system.

12. The adaptor device of claim 1, wherein communicating the second plurality of artifacts to the second decision management system comprises:
deploying the second plurality of artifacts to the second decision management system such that the second plurality of artifacts can be executed by the second decision management system.

13. A method for providing a communication channel between two disparate decision management systems, the method comprising:
receiving, from a first decision management system, a first plurality of artifacts that defines a first set of logic for a decision and that is executable by the first decision management system, wherein the first plurality of artifacts includes a top-down decision flow artifact;
converting the first plurality of artifacts from the first decision management system into a second plurality of artifacts that defines a second set of logic for the decision, that is equivalent to the first set of logic, and that is executable by the second decision management system,
wherein the converting comprises creating a bottom-up rule flow artifact that is equivalent to the top-down decision flow artifact; and
communicating the second plurality of artifacts to the second decision management system, which executes the second plurality of artifacts.

14. The method of claim 13, wherein the first plurality of artifacts includes a rule family artifact; and
wherein converting the first plurality of artifacts further comprises:
converting the rule family artifact into a decision table artifact that is executable by the second decision management system.

15. The method of claim 13, wherein the first plurality of artifacts includes a glossary artifact; and
wherein converting the first plurality of artifacts further comprises:
converting the glossary artifact into a business object model artifact that is executable by the second decision management system.

16. The method of claim 15, wherein converting the first plurality of artifacts further comprises:
converting the glossary artifact into a vocabulary artifact that is used by the second decision management system.

17. The method of claim 15, comprising:
accessing a reference glossary;
identifying a data element in the glossary artifact that is not in the reference glossary; and
creating a new data element in the business object model artifact that is equivalent to the data element.

18. The method of claim 13, wherein the first decision management system is a business decision management system (BDMS).

19. The method of claim 13, comprising:
detecting an error in the first plurality of artifacts from the first decision management system for errors; and
reporting the error to a user.

20. A non-transitory computer-readable medium for providing a communication channel between two disparate decision management systems, the non-transitory computer-readable medium comprising instructions that, in response to execution by a processor, cause the processor to perform operations comprising:
receiving, from a first decision management system, a first plurality of artifacts that defines a first set of logic for a decision and that is executable by the first decision management system, wherein the first plurality of artifacts includes a top-down decision flow artifact;
converting the first plurality of artifacts from the first decision management system into a second plurality of artifacts that defines a second set of logic for the decision, that is equivalent to the first set of logic, and that is executable by the second decision management system,
wherein the converting comprises creating a bottom-up rule flow artifact that is equivalent to the top-down decision flow artifact; and
communicating the second plurality of artifacts to the second decision management system, which executes the second plurality of artifacts.

* * * * *